United States Patent [19]

Williams

[11] Patent Number: 4,651,237
[45] Date of Patent: Mar. 17, 1987

[54] PROGRAMMED DISK CONTROLLER CAPABLE OF OPERATING WITH A VARIETY OF DATA ENCODING TECHNIQUES

[75] Inventor: Brady G. Williams, Los Gatos, Calif.

[73] Assignee: Zilog, Inc., Campbell, Calif.

[21] Appl. No.: 625,461

[22] Filed: Jun. 28, 1984

[51] Int. Cl.⁴ ............................................. G11D 5/09
[52] U.S. Cl. ..................................................... 360/48
[58] Field of Search .................. 364/200, 900; 360/40, 360/48

[56] References Cited

U.S. PATENT DOCUMENTS

| | | | |
|---|---|---|---|
| 4,017,838 | 4/1977 | Breyer | 364/200 |
| 4,151,571 | 4/1979 | Cardot | 360/48 |
| 4,210,959 | 7/1980 | Wozniak | 364/200 |
| 4,357,707 | 11/1982 | Delury | 375/119 |
| 4,433,377 | 2/1984 | Eustis et al. | 364/200 |
| 4,544,962 | 10/1985 | Kato et al. | 360/40 |
| 4,584,616 | 4/1986 | Allen | 360/48 |

OTHER PUBLICATIONS

Universal Floppy Disk Controller, (UFDC) Nov. 1983, Zilof.
Floppy Disk Drive Technology: Ingenious Data Encoding Fills Floppy Disks Twice as Full, *Electronics*, Apr. 7, 1983.

*Primary Examiner*—Gareth D. Shaw
*Assistant Examiner*—John G. Mills
*Attorney, Agent, or Firm*—Majestic, Gallagher, Parsons & Siebert

[57] ABSTRACT

A disk controller system utilizes a single state machine having random access memory which is loaded with program code to translate between computer data and signals obtained by reading from, or developed for writing onto, a magnetic disk in accordance with a selected data encoding technique. The encoding techniques that are discussed include FM, MFM, GCR and RLL. Different program code is loaded into the state machine's memory to make the controller operate with each of these techniques.

5 Claims, 10 Drawing Figures

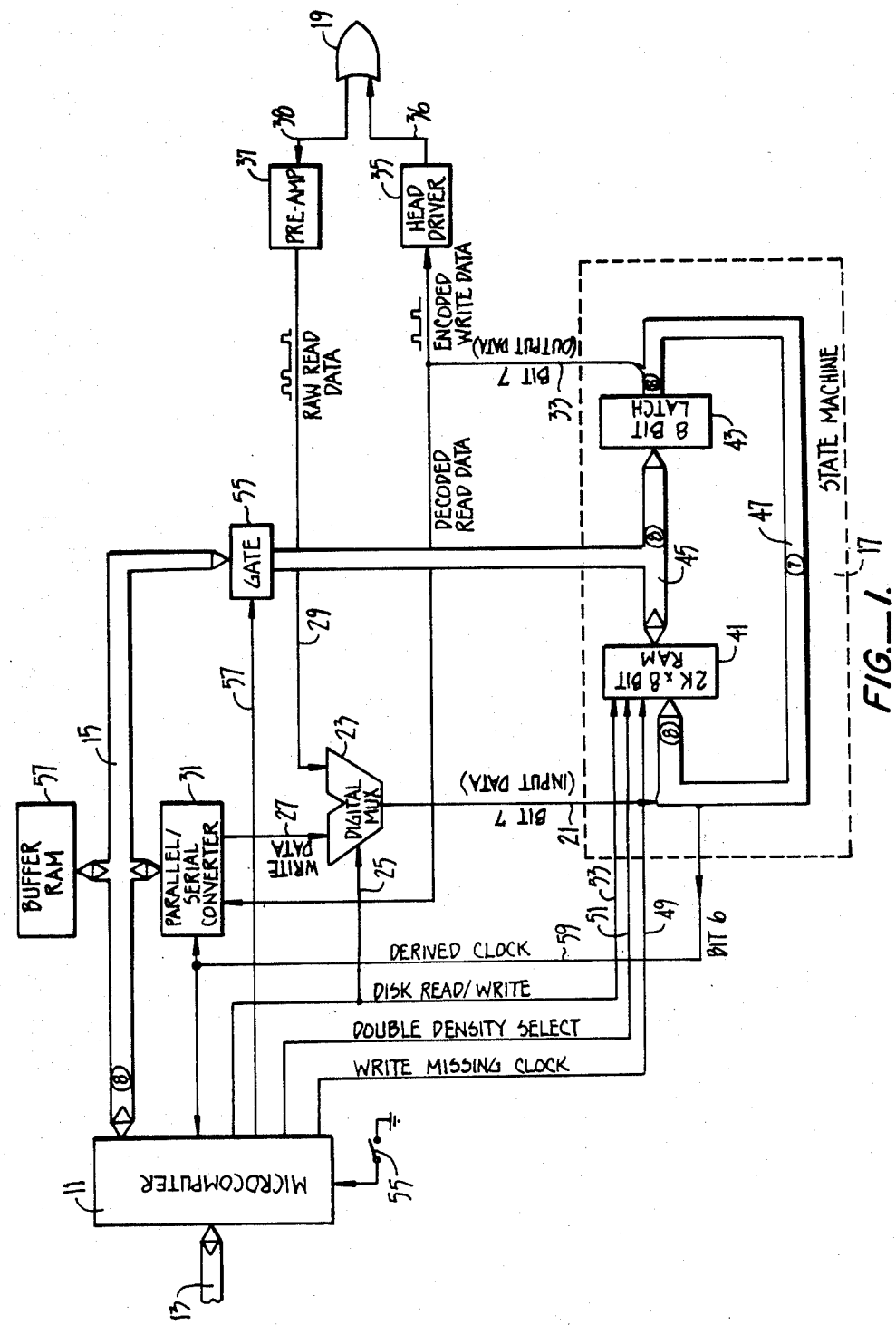
FIG.—1.

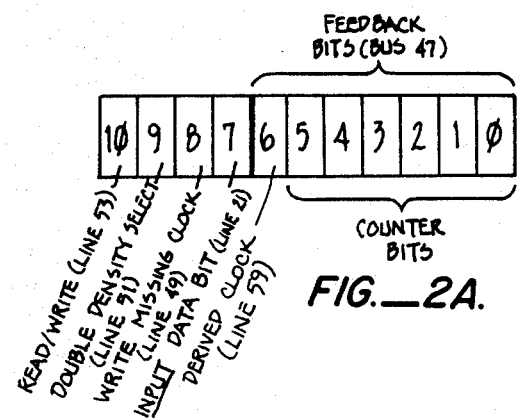
FIG._2A.
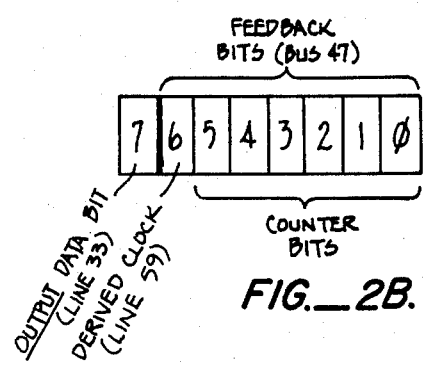
FIG._2B.
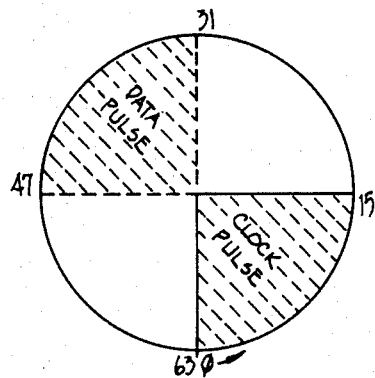
FIG._4A.
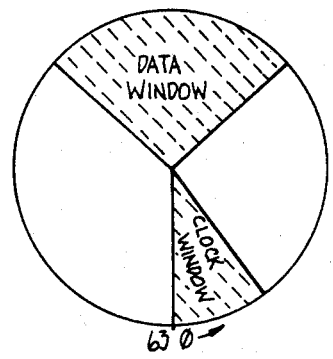
FIG._4B.
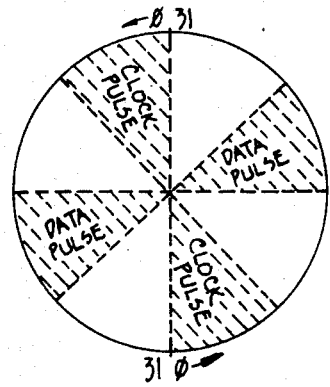
FIG._6A.
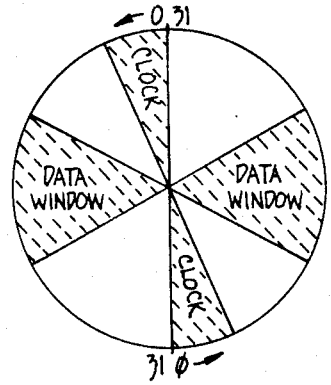
FIG._6B.

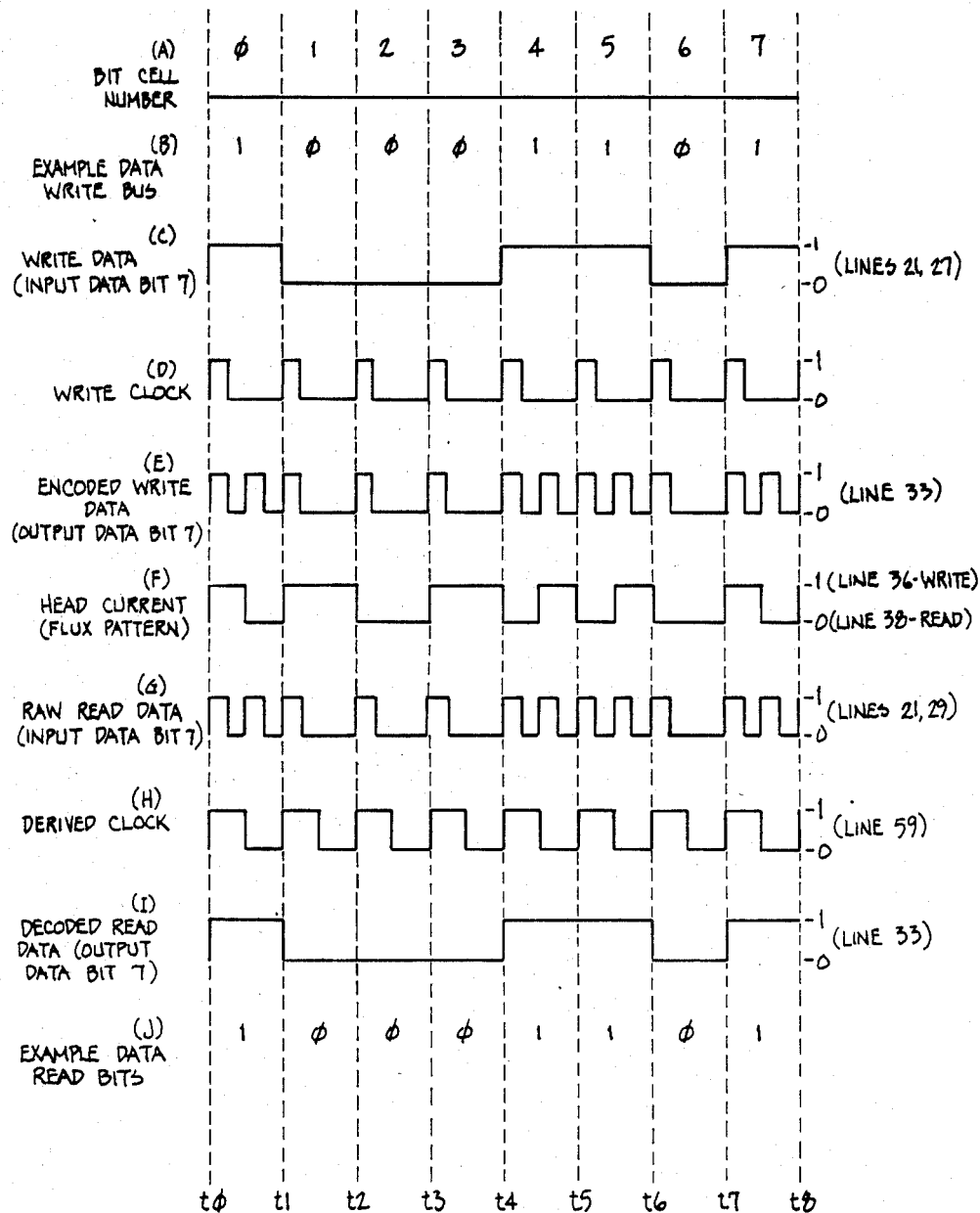
FIG_3.
[FM ENCODE AND DECODE]

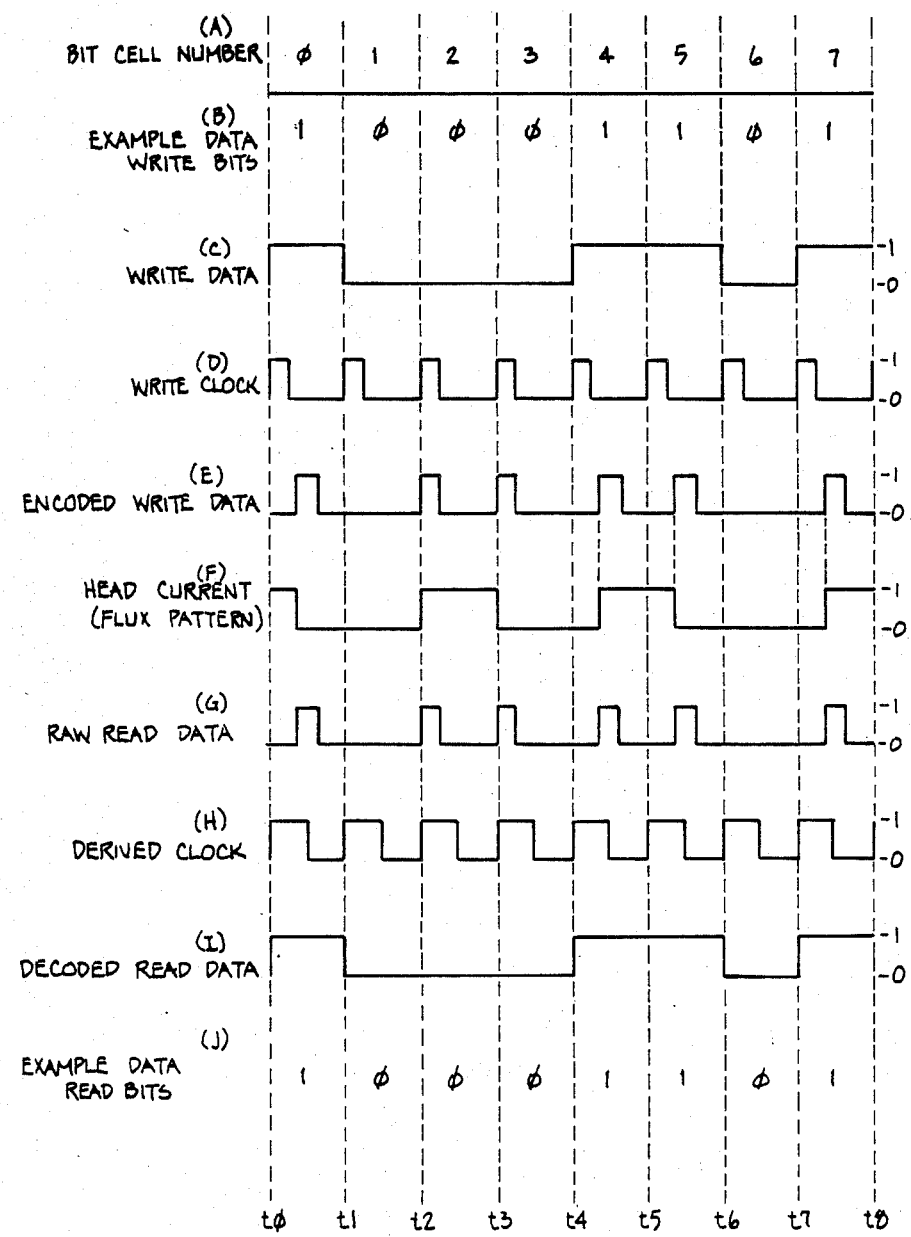
FIG._5.
[MFM ENCODE AND DECODE]

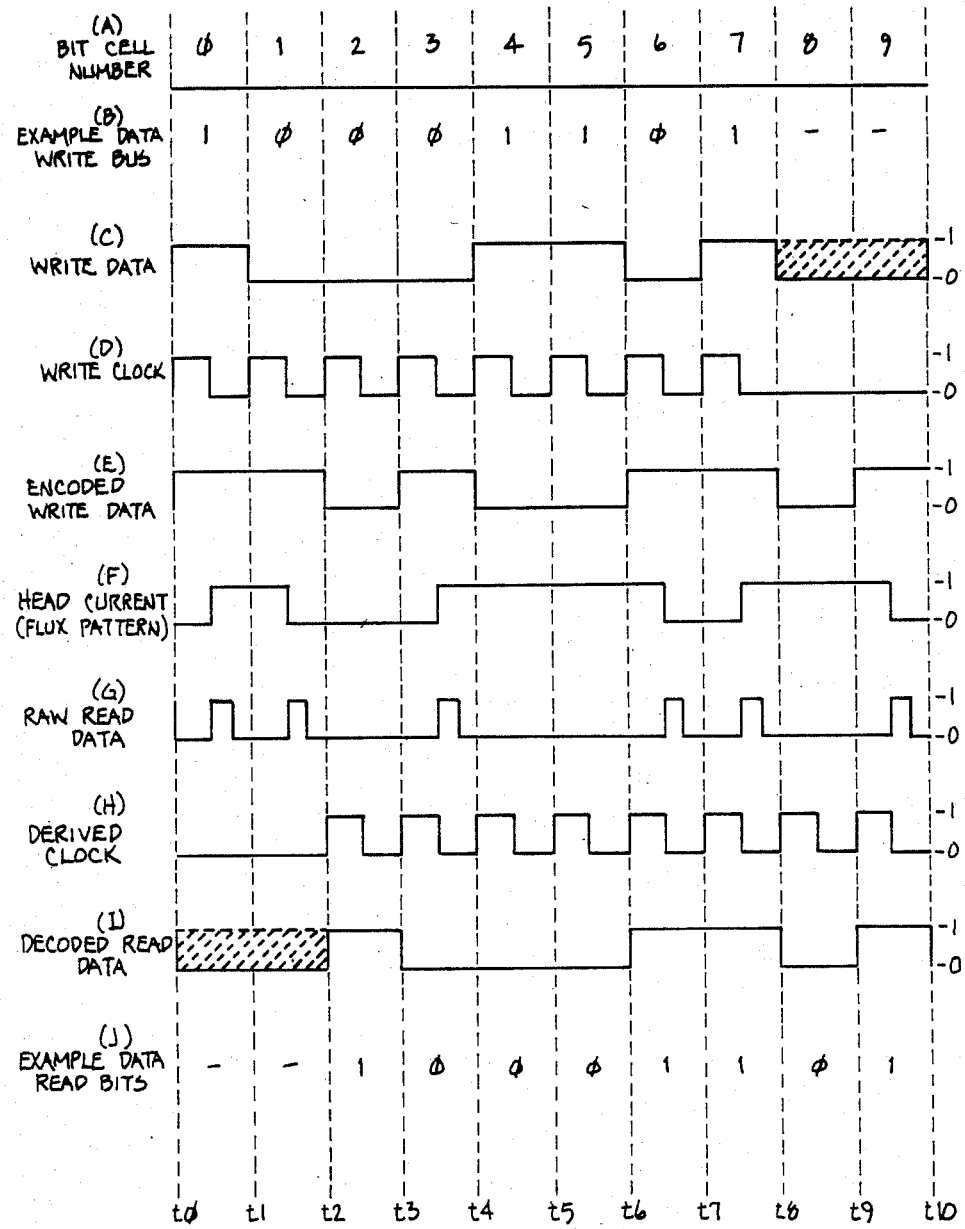
FIG. — 7.
[GCR ENCODE AND DECODE]

PROGRAMMED DISK CONTROLLER CAPABLE OF OPERATING WITH A VARIETY OF DATA ENCODING TECHNIQUES

BACKGROUND OF THE INVENTION

This invention is related generally to the art of magnetic storage of computer data, and more particularly to controllers used with disk drives.

With the recent explosion in the use of disk drives in personal and business minicomputers and microcomputers, has developed a number of different techniques for recording and retrieving digital data from magnetic media, particularly disks. Various computers use different disk systems. The result is that data recorded on a floppy disk, for example, by a disk drive of one computer cannot be read by the disk drive of another.

The aspects of disk data recording that vary among the commercially available disk drives are many. The number of data circular tracks on a disk varies. The number of read/write heads, the speed at which the disk rotates, and the particular signal format required to operate the head movement stepper motor, are other aspects that vary among disk drives. Whether the sectors in the tracks are maintained in "hard" or "soft" form, and whether holes in the disk are monitored to identify the location of the start of tracks or sectors, and if so the number and placement of the holes, are among other variables that exist. Particularly, there are different techniques for encoding the computer data into magnetic transitions which are recorded on the disks.

A frequency modulation (FM) technique is a widely used data encoding technique wherein a clock signal is periodically recorded along a track of a disk with a data pulse occurring between clock signals when a "1" is to be recorded and no pulse between clock pulses when a "0" is to be recorded. A difficulty was recognized early with this technique since the recording of each clock pulse causes a large number of magnetic transitions to be recorded on the disk for a given amount of data. Since magnetic media places limitations on how densely the transitions can be spaced relative to each other, the amount of data that can be placed on a given size disk is thus limited.

Therefore, a modified frequency modulation (MFM) technique was developed wherein a clock pulse is recorded only if there has not been a data pulse recorded for a certain period of time. The reduction of the number of magnetic transitions has thus allowed increasing the density of data, thereby increasing the amount of data that can be placed on a given size disk.

Other various data encoding techniques exist as well. Another is group coded recording (GCR) wherein each data nibble (four bits) is converted into a five or six bit word that is written onto disk without any clock signals. The recorded words are chosen to have particular combinations of "1's" and "0's" that allow a maximum amount of data to be recorded for a given number of magnetic flux transitions on the disk. When the data is read off the disk, these words are reconverted to the data nibble originally recorded.

Another technique is run length limited (RLL) which is a superset of the GCR technique and used primarily in Winchester type disk drives.

The incompatibility of data encoding techniques thus makes it quite difficult to adapt one disk drive that has been built to operate with one technique to read from or write upon disks with another technique. Controllers have been provided in commercial disk copiers that have duplicate data encoding and decoding circuits that are selected by switches, but this duplicity is inappropriate, because of the complexity and cost, for use in commercial minicomputers and microcomputers.

Therefore, it is a principal object of the present invention to provide a disk controller capable of handling several different data encoding techniques that is simple and inexpensive.

SUMMARY OF THE INVENTION

This and additional objects are accomplished by the present invention, wherein, briefly, a common programmable digital state machine is utilized for translating digital data between a form used by the computer and a form recorded on the magnetic disk or other magnetic media. The state machine includes a random access memory in which a different specific code is stored depending upon whether it is desired that the controller operate with the FM, MFM, GCR, RLL, or some other data encoding technique. This sytem allows a particular piece of hardware to be usable with a selected number of different encoding and decoding techniques, simply by appropriately programming the memory of the state machine controller.

Additional objects, features and advantages of the present invention will become apparent from the following description of its preferred embodiment, which description should be taken in conjunction with the accompanying drawings.

BRIEF DESCRIPTION OF THE DRAWINGS

FIG. 1 is a schematic block diagram of a computer disk controller that utilizes the present invention;

FIGS. 2A and 2B illustrate the format of two digital words used in the system of FIG. 1;

FIG. 3 is a timing diagram showing the operation of the system of FIG. 1 for FM encoding and decoding;

FIGS. 4A and 4B illustrate timing for the writing and reading, respectively, of digital data in the system of FIG. 1 when using the FM encoding and decoding technique;

FIG. 5 is a timing diagram showing the operation of the system of FIG. 1 with MFM encoding and decoding;

FIGS. 6A and 6B illustrate timing for the writing and reading, respectively, of digital data in the system of FIG. 1 when using the MFM encoding and decoding technique; and FIG. 7 is a timing diagram showing the operation of the system of FIG. 1 with GCR encoding and decoding.

DESCRIPTION OF A PREFERRED EMBODIMENT

Referring to FIG. 1, a controller that utilizes the techniques of the present invention preferably has a dedicated microprocessor or microcomputer 11 connected with a host computer data and address bus 13. A microcomputer 11 has its own data and address bus 15 that is central to the controller. Data to be written onto a disk passes from the controller bus 15, through a state machine 17 and to a magnetic recording head 19. Data read from a disk by the head 19 passes back through the state machine 17 and onto the controller bus 15. The microcomputer 11 controls the communication of data between the host computer bus 13 and the controller bus 15. A single read/write head 19 is common, but the present invention can be carried out with multiple heads as well. Further, the embodiment is being described with respect to a disk drive, which can be of the floppy disk or hard disk type, but the techniques of the present invention are useful for any digital data and magnetic recording system, including tape drives and the like, wherein different data encoding and decoding techniques are desired to be selectively utilized.

The details of the operation of the system of FIG. 1 will now be described. The state machine 17 has a single input line 21. This line is the output of a digital switch 23 that selects, in response to a control signal in a line 25, the connection of the line 21 with a write data line 27 or a raw read data line 29. When the controller of FIG. 1 is in its write mode, data words on the bus 15 to be recorded are stored in a parallel-to-serial converter 31 and fed serially out, one bit at a time, on the line 27. This serial data is then passed through the state machine 17 to its output line 33. The specific operation of the state machine is described hereinafter. The signal in the output line 33 has been translated from the computer signal presented on the bus 15 into a form that will write the data in the desired format on the computer disk. This encoded write data is applied to an input of a head driving circuit 35 whose output is connected directly to the magnetic recording head 19. The head driving circuit 35 is of a common design and, in combination with a standard read/write head 19, converts the pulses applied to its input to desired north/south magnetic transitions on a magnetic disk.

When a magnetic disk is being read by the head 19, a signal proportional to the magnetic transitions is applied to standard pre-amplifying circuits 37 whose output in a line 29 is raw read data that is again translated by the state machine 17. When in the read mode, the line 29 is connected through the switch 23 to the state machine input line 21. Its output line 33 carries the translated digital data to a serial input of the parallel/serial converter 31, which forms the serially received bits into words that are applied to the controller bus 15 and thence to the host computer on the system bus 13.

The structure and operation of the state machine 17 of FIG. 1 will now be described. A random access memory 41 and a latching circuit 43 are the major components of the state machine 17. These two components are connected together by two separate paths. A first is a data bus 45 connected between a data output of the memory 41 and an input of the latch 43. The second path is a bus 47 which feeds back a portion of the output of the latch 43 to serve as a portion of an address input to the memory 41. FIG. 2B illustrates the form of the eight-bit word output of the latch 43. Seven lines, namely bits 0 through 6, form the feedback bus 47, while the eighth line, identified as carrying bit number 7, is the state machine output line 33 previously discussed.

FIG. 2A illustrates a particular form of an eleven-bit address word applied to an input of the memory 41, wherein seven bits (numbers 0–6) are applied from the output of the latch and bit number 7 is applied as part of the address of the memory 41 from the state machine input line 21 previously discussed. Three other bits (numbers 8–10) are also part of the memory address, bit number 8 provided by a write missing clock line 49 from the microcomputer 11. Bit number 9 is provided by the signal on a line 51 as to whether double density recording is desired. Finally, the last bit number 10 of the address to the memory 11 comes from a line 53 from the microcomputer 11 whose state determines whether the controller is in a mode to write onto a disk or to read from the disk.

Depending upon the particular encoding and decoding format desired, the memory 41 is conveniently loaded through its bus 45. A gate 55 operates responsive to a control signal in a line 57 from the microcomputer 11 to selectively connect the bus 45 to the controller bus 15. When so connected, the microcomputer 11 can, under software control, load the memory 41 by one eight-bit word at a time. The microcomputer 11 first puts an address on the bus 15 and renders the gate 55 conductive, that address being loaded into the latch 43. Because of the feedback bus 47, that address is then placed at the address input to the memory 41. The next step is for the microcomputer 11 to place a data word on the bus 15 that is to be stored in the memory 41 at that address. The process is repeated one data word at a time until the memory 41 is fully loaded. Besides that portion of the memory 41 address placed by the microcomputer 11 on the bus 15, it also controls the three bits in the lines 49, 51 and 53 in order to load data into all desired addresses of the memory 41.

The particular data loaded into the memory 41 for the frequency modulation (FM) encoding and decoding technique is given in Appendix A to this application. Appendix B contains data for the modified frequency modulation (MFM) technique. A five-bit type of GCR encoder and decoder will result if any one of the four versions (GCR 13, GCR 14, GCR 15 or GCR 16) given in Appendix C hereto is loaded into the memory 41. The different GCR code versions are designed for different data rate operation. The computer programs of Exhibits A, B and C are expressed in hexadecimal object code form.

Appendix D hereto gives the object code for operating the microcomputer 11 to carry out the operations being described. The computer program of Exhibit D is written for a Z8® microcomputer available from Zilog, Inc. It is preferably stored in a programmable read only memory provided as part of the Z8 microcomputer 11. The code is further designed to utilize pulses resulting from a photodetector 55 that is positioned to detect sector position marking holes that pass by it. Further, an optional buffer memory 57 is accommodated by the controller program, this buffer being utilized to temporarily hold data being read from the disk or awaiting writing on the disk. If the memory 57 is not utilized, the main memory of the host computer connected to the system bus 13 may be utilized.

Operation of the controller of FIGS. 1, 2A and 2B will now be explained for the example of FM encoding and decoding of data. A timing diagram is given in FIG. 3, showing waveforms at particular location of the system of FIG. 1 during the writing and reading of a particular data word chosen as an example. The data word 10001101 is shown in FIG. 3B in the time sequence that they are presented by the parallel/serial converter 31 onto the lines 27 and 21 to the input of the state machine 17. This data is shown in FIG. 3C as a voltage waveform extending from a low voltage corresponding to its "0" state and a higher voltage corresponding to its "1" state. A periodic, repetitive clock signal shown in FIG. 3D is generated in the state machine 17, as discussed hereinafter.

The state machine 17, operating with the program code of Appendix A to this application loaded into the memory 41, will produce an output in its line 33 that is shown in FIG. 3E. The signal of FIG. 3E is a combination of each clock pulse occurring in FIG. 3D plus a pulse intermediate thereof whenever the data bit in the input line 21 is a "1". If a "0", no intermediate pulse exists. The pattern of FIG. 3E is in accordance with the FM encoding technique. This signal is applied to a normal head driver circuit 35 whose output in the line 36 is a head driving current as shown in FIG. 3F. The result is a magnetic pattern on a track of the magnetic disk being recorded which has a flux change occurring at each of the pulses of the encoded write data of FIG. 3E.

When that data is read by the same head 19 from the same disk, a head current signal of FIG. 3F again appears, this time in a circuit 38. The raw read data of FIG. 3G, in line 29 of FIG. 1, is applied through the switch 23 to the input line 21 of the state machine 17. A drive clock signal of FIG. 3H is one output of the state machine 17, in a line 59, and the decoded read data of FIG. 3I appears on the output line 33 of the state machine 17 in a form to be applied through the converter 31 to the controller bus 15 for use by the host computer.

Obviously, the state machine 17 has to operate differently in its read and write modes. Different program code within the memory 41 is addressed in the read and write cycles since one of the bits of the address to the memory 41 is a read/write command in the line 53 from the microcomputer 11.

Operation of the state machine 17 can be illustrated in another way with respect to FIGS. 4A and 4B, which shown phase diagrams of the write and read operations, respectively. These diagrams show the timing of certain events occurring within a given bit cell. That is, with reference to FIG. 3, the phase diagrams of FIGS. 4A and 4B show one complete cycle of operation within a single bit cell. The first bit cell of FIG. 3 is between times t0 and t1, the time during which the first bit of the example word is operated upon. The state machine 17 is driven by a clock (not shown) in an ordinary manner wherein there are 64 clock cycles, in this particular example, during each bit cell time. Therefore, referring to FIG. 4A, a counter driven by the clock starts at 0 at time t0 of FIG. 3 and advances around to the count of 63 at the time t1. The counter then continues in the same cycle between the times t1 and t2, having started its count over at 0 at time t1. This counter is provided by five bits of the latch and memory 1, as indicated in FIGS. 2A and 2B, and increments one count for each cycle of the state machine clock (not shown). As shown in FIG. 4A, for the FM encoding technique, a clock pulse is generated in the output line 33 of the state machine 17 between the counter counts of 0 and 15. The program code in the memory 41 is such that a "1" exists in the output line 33 during these time periods, as also illustrated in FIGS. 3D and 3E.

As the counter reaches 31, the program code in the memory 41 will cause the output in the line 33 again to go to a "1" from the "0" state it has maintained between the counts of 16 and 31, provided that an input data bit in line 21 during that time is a "1". The code in the memory 41 will result in the state of the output data line 33 remaining a "0" if there is no such input data bit.

Referring to FIG. 4B, a phase diagram showing the operation of one bit cell cycle of the state machine 17 upon reading of data from a disk is illustrated. In the initial clock window time of each cycle, the leading edge of a clock pulse on the input data line 21 of the raw read data of FIG. 3G is looked for. That is, transition of bit number 7 of the FIG. 2A word from a "0" to a "1" during that time is looked for. Similarly, the existence of a pulse is examined during the data window portion of the cycle illustrated in FIG. 4B. If they both occur, the output in the line 33 is a "1", the desired result. If the data pulse does not occur within the window shown in FIG. 4B, then the output in the line 33 during that bit cycle will be 0. The program in the memory 41 also provides for accelerating a reset of the counter formed by the latch 43 in the memory 41 if the leading edge of the clock pulse occurs at any other counter count than 0. This synchronization function is in the nature of a phase locked loop.

A timing diagram for the MFM encoding and decoding technique is given in FIG. 5. The curves shown in FIG. 5 are for the writing and reading of the same data as discussed with respect to FIG. 3 for the FM encoding technique. The waveforms of FIG. 5 are shown for the same points of the circuit of FIG. 1 as those in FIG. 3. Phase diagrams are given in FIGS. 6A and 6B for the MFM encoding and decoding functions, respectively, and correspond to FIGS. 4A and 4B described for the FM technique. Therefore, FIGS. 5, 6A and 6B are not extensively described.

The main differences in operation will be described for the state machine 17 when its memory is loaded with the program code of Appendix B hereto for the MFM technique. A major difference is that the duration of a bit cell is one-half of that of the FM technique since the magnetic transitions are being recorded with a double density. Every clock pulse is not recorded, as it is in the FM technique, but rather the clock's pulse is only applied to the write head if there has been a duration without a data "1" pulse exceeding some threshold amount. Bit number 5 of the state machine counter, as illustrated in FIGS. 2A and 2B, serves a function of remembering whether a "1" data pulse occurred in the last predetermined period of time so that it is known whether to write a clock pulse or not. The counter of the state machine, in this MFM implementation, need only go to 31, so only five bits are required, thereby to free up the sixth counter bit for this purpose.

It will be noticed from FIG. 1 that a double density select line 51 from the microcomputer 11 is also one of the address lines to the memory 41. The purpose of this is to select between the single density FM technique and the double density MFM technique when the program code for both are stored in the memory 41 at one time. This can be done since the two technique are similar and a portion of the program code for each is the same.

Referring to FIG. 7, a timing diagram for a five-bit GCR encoding and decoding technique is shown as implemented in the controller of FIG. 1. It shows the operation of the system when utilizing the program code of Appendix C in the memory 41 for the same bit pattern as used as an example in explaining the FM and MFM techniques with respect to FIGS. 3 and 5. A translation table between data nibbles and the five-bit combinations that are recorded on the disk are given as part of the system controlling software of Appendix D.

The RAM 41 is preferably a fast RAM 2016-1. The latch 43 may be a 74LS374, the switch 23 a 74LS298 and the converter 31 a 74LS299.

Although the present invention has been described with respect to its preferred embodiment, it will be understood that the invention is entitled to protections within the full scope of the appended claims.

FM STATE MACHINE CODE

```
000 E3 02 22 00 00 00 00 00 00 00 00 00 00 00 00 00
010 00 00 00 00 00 00 00 00 00 00 00 00 00 00 00 00
020 21 22 23 24 25 26 27 28 29 2A 2B 2C 2D 2E 2F 30
030 31 32 33 34 35 80 37 38 39 3A 3B 3C 3D 3E 3F B0
040 00 00 00 00 00 00 00 00 00 00 00 00 00 00 00 00
050 00 00 00 00 00 00 00 00 00 00 00 00 00 00 00 00
060 00 00 00 00 00 00 00 00 00 00 00 00 00 00 00 00
070 00 00 00 00 00 00 00 00 00 00 00 00 00 00 00 00
080 E3 82 83 84 85 86 87 88 89 8A 8B 8C 8D 8E 8F A0
090 00 00 00 00 00 00 00 00 00 00 00 00 00 00 00 00
0A0 A1 A2 A3 A4 A5 A6 A7 A8 20 00 00 00 00 00 00 00
0B0 B1 B2 B3 B4 B5 B6 B7 B8 B9 81 00 00 00 00 00 00
0C0 C1 C2 C3 C4 C5 C6 C7 C8 C9 CA CB CC CD CE CF E0
0D0 00 00 00 00 00 00 00 00 00 00 00 00 00 00 00 00
0E0 E1 E2 E3 01 00 00 00 00 00 00 00 00 00 00 00 00
0F0 00 00 00 00 00 00 00 00 00 00 00 00 00 00 00 00
100 E3 02 23 04 84 03 00 00 00 00 00 00 00 00 00 00
110 00 00 00 00 00 00 00 00 00 00 00 00 00 00 00 00
120 00 22 23 24 25 26 27 28 29 2A 2B 2C 2D 2E 2F 30
130 50 00 00 00 00 00 00 00 00 00 00 00 00 00 00 00
140 41 42 43 44 45 46 47 48 49 4A 4B 4C 4D 4E 4F 52
150 51 D0 53 54 55 56 69 58 59 5A 5B 5C 5D 5E 21 60
160 61 62 63 64 57 66 67 68 81 6A 6B 6C 6D 6E 6F 70
170 01 72 73 74 05 00 00 00 00 00 00 00 00 00 00 00
180 91 82 83 84 85 86 87 88 89 8A 8B 8C 8D 8E 8F 90
190 D1 D0 00 00 00 00 00 00 00 00 00 00 00 00 00 00
1A0 00 00 00 00 00 00 00 00 00 00 00 00 00 00 00 00
1B0 00 00 00 00 00 00 00 00 00 00 00 00 00 00 00 00
1C0 C1 C2 C3 C4 C5 C6 C7 C8 C9 CA CB CC CD CE CF E0
1D0 40 51 D3 D4 D5 D6 D7 D8 D9 DA DB DC DD DE DF 5F
1E0 E1 E2 E3 80 00 00 00 00 00 00 00 00 00 00 00 00
1F0 00 00 00 00 00 00 00 00 00 00 00 00 00 00 00 00
200 E3 02 36 00 00 00 00 00 00 00 00 00 00 00 00 00
210 00 00 00 00 00 00 00 00 00 00 00 00 00 00 00 00
220 36 36 37 38 39 3A 3A 3B 3C 3D 3E 3E 3F 3F B0 B1
230 B2 B3 B3 B4 B5 B6 37 38 39 3A 3B 3C 3D 3E 3F B0
240 00 00 00 00 00 00 00 00 00 00 00 00 00 00 00 00
250 00 00 00 00 00 00 00 00 00 00 00 00 00 00 00 00
260 00 00 00 00 00 00 00 00 00 00 00 00 00 00 00 00
270 00 00 00 00 00 00 00 00 00 00 00 00 00 00 00 00
280 B7 C0 C0 C1 C2 C3 C4 C4 C5 C6 C7 C8 C8 C9 C9 CA
290 00 00 00 00 00 00 00 00 00 00 00 00 00 00 00 00
2A0 CB CC CD CD CE CF E0 E1 E1 00 00 00 00 00 00 00
2B0 B1 B2 B3 B4 B5 B6 B7 B8 B9 81 00 00 00 00 00 00
2C0 C1 C2 C3 C4 C5 C6 C7 C8 C9 CA CB CC CD CE CF E0
2D0 00 00 00 00 00 00 00 00 00 00 00 00 00 00 00 00
2E0 E1 E2 E3 01 00 00 00 00 00 00 00 00 00 00 00 00
2F0 00 00 00 00 00 00 00 00 00 00 00 00 00 00 00 00
```

APPENDIX A

```
300 E3 04 84 04 84 03 00 00 00 00 00 00 00 00 00 00
310 00 00 00 00 00 00 00 00 00 00 00 00 00 00 00 00
320 00 83 84 85 85 86 86 87 88 89 8A 8A 8B 8C 8D 8E
```

```
330 8E 00 00 00 00 00 00 00 00 00 00 00 00 00 00 00
340 D4 D5 D6 D6 D7 D8 D9 DA DA DB DB DC DD DE DF DF
350 D2 D2 5F 60 61 62 69 65 65 66 67 68 81 81 82 60
360 61 62 63 64 57 66 67 68 81 71 71 72 73 74 05 05
370 03 72 73 74 05 00 00 00 00 00 00 00 00 00 00 00
380 91 82 83 84 85 86 87 88 89 8A 8B 8C 8D 8E 8F 90
390 D1 D0 00 00 00 00 00 00 00 00 00 00 00 00 00 00
3A0 00 00 00 00 00 00 00 00 00 00 00 00 00 00 00 00
3B0 00 00 00 00 00 00 00 00 00 00 00 00 00 00 00 00
3C0 C1 C2 C3 C4 C5 C6 C7 C8 C9 CA CB CC CD CE CF E0
3D0 D3 D2 D3 D4 D5 D6 D7 D8 D9 DA DB DC DD DE DF 5F
3E0 E1 E2 E3 80 00 00 00 00 00 00 00 00 00 00 00 00
3F0 00 00 00 00 00 00 00 00 00 00 00 00 00 00 00 00
400 81 40 03 04 05 06 07 08 09 0A 0B 0C 0D 0E 0F 10
410 11 12 13 14 15 80 17 18 81 00 00 00 00 00 00 00
420 02 03 04 81 00 00 00 00 00 00 00 00 00 00 00 00
430 00 00 00 00 00 00 00 00 00 00 00 00 00 00 00 00
440 41 42 43 44 45 46 47 48 49 4A 4B 4C 4D 4E 4F 50
450 51 52 53 54 55 21 22 00 00 00 00 00 00 00 00 00
460 00 00 00 00 00 00 00 00 00 00 00 00 00 00 00 00
470 00 00 00 00 00 00 00 00 00 00 00 00 00 00 00 00
480 16 01 00 00 00 00 00 00 00 00 00 00 00 00 00 00
490 00 00 00 00 00 00 00 00 00 00 00 00 00 00 00 00
4A0 C0 C1 00 00 00 00 00 00 00 00 00 00 00 00 00 00
4B0 00 00 00 00 00 00 00 00 00 00 00 00 00 00 00 00
4C0 C1 C2 C3 C4 C5 C6 C7 C8 C9 CA CB CC CD CE CF D0
4D0 D1 D2 D3 D4 D5 20 02 00 00 00 00 00 00 00 00 00
4E0 C0 00 00 00 00 00 00 00 00 00 00 00 00 00 00 00
4F0 00 00 00 00 00 00 00 00 00 00 00 00 00 00 00 00
500 81 40 03 04 05 06 07 08 09 0A 0B 0C 0D 0E 0F 10
510 11 12 13 14 15 80 17 18 A0 00 00 00 00 00 00 00
520 02 03 04 81 00 00 00 00 00 00 00 00 00 00 00 00
530 00 00 00 00 00 00 00 00 00 00 00 00 00 00 00 00
540 41 42 43 44 45 46 47 48 49 4A 4B 4C 4D 4E 4F 50
550 51 52 53 54 55 56 22 00 00 00 00 00 00 00 00 00
560 00 00 00 00 00 00 00 00 00 00 00 00 00 00 00 00
570 00 00 00 00 00 00 00 00 00 00 00 00 00 00 00 00
580 16 C0 00 00 00 00 00 00 00 00 00 00 00 00 00 00
590 00 00 00 00 00 00 00 00 00 00 00 00 00 00 00 00
5A0 C0 C1 00 00 00 00 00 00 00 00 00 00 00 00 00 00
5B0 00 00 00 00 00 00 00 00 00 00 00 00 00 00 00 00
5C0 C1 C2 C3 C4 C5 C6 C7 C8 C9 CA CB CC CD CE CF D0
5D0 D1 D2 D3 D4 D5 D6 21 00 00 00 00 00 00 00 00 00
5E0 C0 00 00 00 00 00 00 00 00 00 00 00 00 00 00 00
5F0 00 00 00 00 00 00 00 00 00 00 00 00 00 00 00 00
600 40 18 03 04 05 06 07 08 09 0A 0B 0C 0D 0E 0F 10
610 11 12 13 14 15 80 17 23 19 1A 1B 1C 1D 1E 1F 83
620 91 03 40 81 90 00 00 00 00 00 00 00 00 00 00 00
630 00 00 00 00 00 00 00 00 00 00 00 00 00 00 00 00
640 41 42 43 44 45 46 47 48 49 4A 4B 01 4D 4E 4F 50
650 51 52 53 54 55 56 57 86 59 5A 5B 5C 5D 5E 5F DA
660 00 00 00 00 00 00 00 00 00 00 00 00 00 00 00 00
670 00 00 00 00 00 00 00 00 00 00 00 00 00 00 00 00
680 D7 C0 A1 84 85 40 87 88 89 8A 8B 8C 8D 8E 24 20
690 91 40 93 94 95 96 97 98 99 9A 9B 20 22 00 00 00
6A0 C0 C1 00 00 00 00 00 00 00 00 00 00 00 00 00 00
6B0 00 00 00 00 00 00 00 00 00 00 00 00 00 00 00 00
```

```
6C0  C1 C2 C3 C4 C5 C6 C7 C8 C9 CA CB CC CD CE CF D0
6D0  D1 D2 D3 D4 D5 D6 02 D8 D9 E0 DB DC DD 92 00 00
6E0  C0 00 00 00 00 00 00 00 00 00 00 00 00 00 00 00
6F0  00 00 00 00 00 00 00 00 00 00 00 00 00 00 00 00
700  40 18 03 04 05 06 07 08 09 0A 0B 0C 0D 0E 0F 10
710  11 12 13 14 15 80 17 23 19 1A 1B 1C 1D 1E 1F 83
720  91 03 58 81 90 00 00 00 00 00 00 00 00 00 00 00
730  00 00 00 00 00 00 00 00 00 00 00 00 00 00 00 00
740  41 42 43 44 45 46 47 48 49 4A 4B 01 4D 4E 4F 50
750  51 52 53 54 55 56 57 86 59 5A 5B 5C 5D 5E 5F DA
760  00 00 00 00 00 00 00 00 00 00 00 00 00 00 00 00
770  00 00 00 00 00 00 00 00 00 00 00 00 00 00 00 00
780  16 C0 A1 84 85 4C 87 88 89 8A 8B 8C 8D 8E 8F 20
790  91 58 93 94 95 96 97 98 99 9A 9B 9C 22 00 00 00
7A0  C0 C1 00 00 00 00 00 00 00 00 00 00 00 00 00 00
7B0  00 00 00 00 00 00 00 00 00 00 00 00 00 00 00 00
7C0  C1 C2 C3 C4 C5 C6 C7 C8 C9 CA CB CC CD CE CF D0
7D0  D1 D2 D3 D4 D5 D6 02 D8 D9 82 DB DC DD 92 00 00
7E0  C0 00 00 00 00 00 00 00 00 00 00 00 00 00 00 00
7F0  00 00 00 00 00 00 00 00 00 00 00 00 00 00 00 00

MFM STATE MACHINE CODE 000  04 40 41 42 05 06 07 08 09 0A 0B 0C 0D 0E 01 10
010  11 12 13 14 15 16 02 18 19 1A 1B 1C 1D 1E 1F 20
020  21 03 23 24 25 26 27 28 29 2A 2B 2C 80 00 00 00
030  00 00 00 00 00 00 00 00 00 00 00 00 00 00 00 00
040  43 4E 59 44 45 46 47 48 49 4A 4B 4C 4D 42 4F 50
050  51 52 53 54 55 56 57 58 04 5A 5B 5C 5D 5E 5F 60
060  61 62 63 17 00 00 00 00 00 00 00 00 00 00 00 00
070  00 00 00 00 00 00 00 00 00 00 00 00 00 00 00 00
080  C0 00 00 00 00 00 00 00 00 00 00 00 00 00 00 00
090  00 00 00 00 00 00 00 00 00 00 00 00 00 00 00 00
0A0  00 00 00 00 00 00 00 00 00 00 00 00 00 00 00 00
0B0  00 00 00 00 00 00 00 00 00 00 00 00 00 00 00 00
0C0  59 C2 C3 C4 C5 C6 C7 C8 C9 22 00 00 00 00 00 00
0D0  00 00 00 00 00 00 00 00 00 00 00 00 00 00 00 00
0E0  00 00 00 00 00 00 00 00 00 00 00 00 00 00 00 00
0F0  00 00 00 00 00 00 00 00 00 00 00 00 00 00 00 00
100  04 40 41 42 05 06 07 08 09 0A 0B 0C 0D 0E 01 10
110  11 12 13 14 15 16 02 18 19 1A 1B 1C 1D 1E 1F 20
120  21 03 23 24 25 26 27 28 29 2A 2B 2C 80 00 00 00
130  00 00 00 00 00 00 00 00 00 00 00 00 00 00 00 00
140  43 4E 59 44 45 46 47 48 49 4A 4B 4C 4D C8 4F 50
150  51 52 53 54 55 56 57 58 04 5A 5B 5C 5D 5E 5F 60
160  61 62 63 17 00 00 00 00 00 00 00 00 00 00 00 00
170  00 00 00 00 00 00 00 00 00 00 00 00 00 00 00 00
180  C0 00 00 00 00 00 00 00 00 00 00 00 00 00 00 00
190  00 00 00 00 00 00 00 00 00 00 00 00 00 00 00 00
1A0  00 00 00 00 00 00 00 00 00 00 00 00 00 00 00 00
1B0  00 00 00 00 00 00 00 00 00 00 00 00 00 00 00 00
1C0  59 C2 C3 C4 C5 C6 C7 C8 C9 22 00 00 00 00 00 00
1D0  00 00 00 00 00 00 00 00 00 00 00 00 00 00 00 00
1E0  00 00 00 00 00 00 00 00 00 00 00 00 00 00 00 00
1F0  00 00 00 00 00 00 00 00 00 00 00 00 00 00 00 00
200  04 16 41 16 0F 10 10 11 12 12 13 13 14 15 15 10
```

```
210  11 12 13 14 15 16 02 0F 10 10 11 12 12 13 13 14
220  15 15 23 24 25 26 27 28 29 2A 2B 2C 80 00 00 00
230  00 00 00 00 00 00 00 00 00 00 00 00 00 00 00 00
240  C1 4E C1 C2 C2 C3 C4 C4 C5 C5 C6 C7 C7 04 4F 50
250  51 52 53 54 55 56 57 58 04 C2 C2 C3 C4 C4 C5 C5
260  C6 C7 C7 C8 00 00 00 00 00 00 00 00 00 00 00 00
270  00 00 00 00 00 00 00 00 00 00 00 00 00 00 00 00
280  C0 00 00 00 00 00 00 00 00 00 00 00 00 00 00 00
290  00 00 00 00 00 00 00 00 00 00 00 00 00 00 00 00
2A0  00 00 00 00 00 00 00 00 00 00 00 00 00 00 00 00
2B0  00 00 00 00 00 00 00 00 00 00 00 00 00 00 00 00
2C0  C1 C2 C3 C4 C5 C6 C7 C8 C9 22 00 00 00 00 00 00
2D0  00 00 00 00 00 00 00 00 00 00 00 00 00 00 00 00
2E0  00 00 00 00 00 00 00 00 00 00 00 00 00 00 00 00
2F0  00 00 00 00 00 00 00 00 00 00 00 00 00 00 00 00
```

APPENDIX B

```
300  04 16 41 16 0F 10 10 11 12 12 13 13 14 15 15 10
310  11 12 13 14 15 16 02 0F 10 10 11 12 12 13 13 14
320  15 15 23 24 25 26 27 28 29 2A 2B 2C 80 00 00 00
330  00 00 00 00 00 00 00 00 00 00 00 00 00 00 00 00
340  C1 4E C1 C2 C2 C3 C4 C4 C5 C5 C6 C7 C7 C8 4F 50
350  51 52 53 54 55 56 57 58 04 C2 C2 C3 C4 C4 C5 C5
360  C6 C7 C7 C8 00 00 00 00 00 00 00 00 00 00 00 00
370  00 00 00 00 00 00 00 00 00 00 00 00 00 00 00 00
380  C0 00 00 00 00 00 00 00 00 00 00 00 00 00 00 00
390  00 00 00 00 00 00 00 00 00 00 00 00 00 00 00 00
3A0  00 00 00 00 00 00 00 00 00 00 00 00 00 00 00 00
3B0  00 00 00 00 00 00 00 00 00 00 00 00 00 00 00 00
3C0  C1 C2 C3 C4 C5 C6 C7 C8 C9 22 00 00 00 00 00 00
3D0  00 00 00 00 00 00 00 00 00 00 00 00 00 00 00 00
3E0  00 00 00 00 00 00 00 00 00 00 00 00 00 00 00 00
3F0  00 00 00 00 00 00 00 00 00 00 00 00 00 00 00 00
400  19 02 03 04 05 06 07 08 09 0A 0B 0C 40 0E 0F 10
410  11 12 13 14 15 16 21 22 58 1A 1B 1C 1D 1E 1F 80
420  02 18 58 00 00 00 00 00 00 00 00 00 00 00 00 00
430  00 00 00 00 00 00 00 00 00 00 00 00 00 00 00 00
440  41 42 43 44 45 46 47 48 49 4A 61 01 4D 4E 4F 50
450  51 52 53 54 55 56 57 0D 59 5A 5B 5C 5D 5E 5F C0
460  4B 01 4D 00 00 00 00 00 00 00 00 00 00 00 00 00
470  00 00 00 00 00 00 00 00 00 00 00 00 00 00 00 00
480  81 82 83 84 C4 86 87 88 89 8A 8B 8C 8D 8E 8F 22
490  62 00 00 00 00 00 00 00 00 00 00 00 00 00 00 00
4A0  00 00 00 00 00 00 00 00 00 00 00 00 00 00 00 00
4B0  00 00 00 00 00 00 00 00 00 00 00 00 00 00 00 00
4C0  C1 C2 C3 19 C5 C6 C7 C8 C9 CA CB CC CD CE CF 20
4D0  D1 D2 D3 D4 D5 D6 D7 D8 D9 DA DB 85 00 00 00 00
4E0  00 00 00 00 00 00 00 00 00 00 00 00 00 00 00 00
4F0  00 00 00 00 00 00 00 00 00 00 00 00 00 00 00 00
500  19 02 03 04 05 06 07 08 09 0A 0B 0C D0 0E 0F 10
510  11 12 13 14 15 16 17 22 58 1A 1B 1C 1D 1E 1F 80
520  02 18 4C 00 00 00 00 00 00 00 00 00 00 00 00 00
530  00 00 00 00 00 00 00 00 00 00 00 00 00 00 00 00
540  41 42 43 44 45 46 47 48 49 60 61 01 4D 4E 4F 50
550  51 52 53 54 55 56 57 0D 59 5A 5B 5C 5D 5E 5F C0
```

```
560 4B 01 4D 00 00 00 00 00 00 00 00 00 00 00 00 00
570 00 00 00 00 00 00 00 00 00 00 00 00 00 00 00 00
580 81 82 83 84 D0 86 87 88 89 8A 8B 8C 8D 8E 8F 90
590 62 00 00 00 00 00 00 00 00 00 00 00 00 00 00 00
5A0 00 00 00 00 00 00 00 00 00 00 00 00 00 00 00 00
5B0 00 00 00 00 00 00 00 00 00 00 00 00 00 00 00 00
5C0 C1 C2 C3 19 C5 C6 C7 C8 C9 CA CB CC CD CE 61 20
5D0 D1 D2 D3 D4 D5 D6 D7 D8 D9 DA DB 85 00 00 00 00
5E0 00 00 00 00 00 00 00 00 00 00 00 00 00 00 00 00
5F0 00 00 00 00 00 00 00 00 00 00 00 00 00 00 00 00
600 0D 02 03 04 05 06 07 08 09 0A 0B 0C 40 0E 0F 10
610 11 12 13 14 15 16 4C 18 58 1A 1B 1C 1D 1E 1F 80
620 5A 8C 00 00 00 00 00 00 00 00 00 00 00 00 00 00
630 00 00 00 00 00 00 00 00 00 00 00 00 00 00 00 00
640 41 42 43 44 45 46 47 48 49 4A 4B 01 4D 0D 4F 50
650 51 52 53 54 55 56 57 17 59 19 5B 5C 5D 5E 5F C0
660 D1 01 00 00 00 00 00 00 00 00 00 00 00 00 00 00
670 00 00 00 00 00 00 00 00 00 00 00 00 00 00 00 00
680 21 20 83 CF 85 86 87 88 89 8A 60 21 4C 00 00 00
690 00 00 00 00 00 00 00 00 00 00 00 00 00 00 00 00
6A0 00 00 00 00 00 00 00 00 00 00 00 00 00 00 00 00
6B0 00 00 00 00 00 00 00 00 00 00 00 00 00 00 00 00
6C0 C1 C2 C3 82 C5 C6 C7 C8 C9 CA CB CC CD CE 61 D0
6D0 84 8C 00 00 00 00 00 00 00 00 00 00 00 00 00 00
6E0 00 00 00 00 00 00 00 00 00 00 00 00 00 00 00 00
6F0 00 00 00 00 00 00 00 00 00 00 00 00 00 00 00 00
700 0D 02 03 04 05 06 07 08 09 0A 0B 0C 40 0E 0F 10
710 11 12 13 14 15 16 4E 18 58 1A 1B 1C 1D 1E 1F 80
720 5A 8C 00 00 00 00 00 00 00 00 00 00 00 00 00 00
730 00 00 00 00 00 00 00 00 00 00 00 00 00 00 00 00
740 41 42 43 44 45 46 47 48 49 4A 61 01 4D 0D 4F 50
750 51 52 53 54 55 56 57 17 59 19 5B 5C 5D 5E 5F C0
760 D1 01 00 00 00 00 00 00 00 00 00 00 00 00 00 00
770 00 00 00 00 00 00 00 00 00 00 00 00 00 00 00 00
780 81 20 83 CF 85 86 87 88 89 8A 8B 21 5A 00 00 00
790 00 00 00 00 00 00 00 00 00 00 00 00 00 00 00 00
7A0 00 00 00 00 00 00 00 00 00 00 00 00 00 00 00 00
7B0 00 00 00 00 00 00 00 00 00 00 00 00 00 00 00 00
7C0 C1 C2 C3 82 C5 C6 C7 C8 C9 CA CB CC CD CE 61 D0
7D0 84 8C 00 00 00 00 00 00 00 00 00 00 00 00 00 00
7E0 00 00 00 00 00 00 00 00 00 00 00 00 00 00 00 00
7F0 00 00 00 00 00 00 00 00 00 00 00 00 00 00 00 00
```

GCR13 STATE MACHINE CODE

```
000 60 60 03 40 42 41 07 43 44 45 0B 46 47 48 01 10
010 50 50 50 80 04 05 11 81 12 08 84 09 0C 0D 85 88
020 21 31 23 24 25 26 27 28 29 2A 2B 20 13 02 0F 14
030 31 32 33 34 35 36 37 38 39 0E 16 17 82 06 18 19
040 57 64 72 74 70 C9 CE D2 D9 63 77 4C 4D 4E 4F 51
050 51 52 53 54 2C 56 2D 58 59 2E 5B 5C 5D 5E 5F 61
060 30 62 2F 15 65 66 3A 68 69 6A 6B 6C 6D 6E 6F 3B
070 71 3C 73 3D 75 76 3E 78 79 7A 7B 7C 7D 3F 7F 1A
080 C0 C1 83 C2 C3 C4 87 C5 C6 0A 1C 1E 86 00 8F 90
090 D0 00 00 00 00 00 00 00 00 00 00 00 00 00 00 00
0A0 00 00 00 00 00 00 00 00 00 00 00 00 00 00 00 00
0B0 00 00 00 00 00 00 00 00 00 00 00 00 00 00 00 00
```

```
0C0  55 70 74 C9 D2 CE D9 C8 1B CA CB 8E CD 89 CF D1
0D0  51 8A D3 D4 D5 D6 43 D8 1D DA DB 8B DD DE DF 45
0E0  E1 2C E3 1F 00 00 00 00 00 00 00 00 00 00 00 00
0F0  00 00 00 00 00 00 00 00 00 00 00 00 00 00 00 00
100  60 4A 41 40 05 06 07 08 09 0A 0B 0C 0D 0E 01 14
110  04 0F 51 1C 15 16 17 18 19 1A 1B 80 1D 1E 1F 20
120  21 22 23 24 25 26 02 28 29 2A 2B 2C 2D 2E 2F 31
130  49 81 33 34 35 36 37 38 39 3A 3B 3C 3D 03 3F 83
140  CC E0 43 44 45 46 47 48 4B 53 4B 4C 4D 4E 4F 50
150  49 42 5D 54 55 56 57 58 59 5A 5B 5C 12 5E 5F 61
160  30 62 63 64 65 66 10 68 69 32 6B 6C 6D 6E 6F 70
170  71 72 73 74 13 00 00 00 00 00 00 00 00 00 00 00
180  C0 E1 C1 84 85 86 87 88 89 8A 82 00 00 00 00 00
190  00 00 00 00 00 00 00 00 00 00 00 00 00 00 00 00
1A0  00 00 00 00 00 00 00 00 00 00 00 00 00 00 00 00
1B0  00 00 00 00 00 00 00 00 00 00 00 00 00 00 00 00
1C0  4B 67 00 00 00 00 00 C8 C9 CA CB CC CD CE CF D0
1D0  67 D2 D3 D4 D5 D6 D7 D8 D9 DA DB C7 52 00 00 00
1E0  00 E0 00 00 00 00 00 00 00 00 00 00 00 00 00 00
1F0  00 00 00 00 00 00 00 00 00 00 00 00 00 00 00 00
200  60 2A 41 41 42 41 45 45 44 45 48 48 1E 48 29 3A
210  16 50 8F 2F 04 05 11 3F 8E 08 84 09 8B 0D 85 88
220  22 23 23 24 25 26 27 29 29 2A 2B 20 2F 05 3A 14
230  23 23 24 25 25 26 26 27 28 29 16 3F 84 09 8E 19
240  64 64 C8 C9 7F C9 D9 DD D9 63 77 5C 5C 5D 5E 5E
250  D2 5F 5F 51 62 15 15 64 65 66 5B 5C 5D 5E 5F 61
260  30 62 2F 15 65 66 3A 78 78 79 7A 7A 7B 7B 7C 7D
270  1A 1A 1B 1B C9 CA CB 78 79 7A 7B 7C 7D 3F 7F 1A
280  14 19 C3 C3 C3 C4 C6 C6 C6 0D 8B 1E 88 00 8F 90
290  D0 00 00 00 00 00 00 00 00 00 00 00 00 00 00 00
2A0  00 00 00 00 00 00 00 00 00 00 00 00 00 00 00 00
2B0  00 00 00 00 00 00 00 00 00 00 00 00 00 00 00 00
2C0  53 7F C9 C9 DD D9 D9 C8 1B CA CB 8E 1D 1D D9 DA
2D0  D2 DB DE DE DF 45 45 D8 1D DA DB 8B DD DE DF 45
2E0  1F 1F E3 1F 00 00 00 00 00 00 00 00 00 00 00 00
2F0  00 00 00 00 00 00 00 00 00 00 00 00 00 00 00 00
```

APPENDIX C

```
300  60 1B 31 8A 14 14 15 16 16 17 17 18 19 1A 1A 14
310  0F 0F 51 28 15 16 17 18 19 1A 1B 80 29 29 2A 2B
320  2B 2C 2C 2D 2E 2F 2F 28 29 2A 2B 2C 2D 2E 2F 31
330  5D 81 3F 83 83 84 85 85 86 86 87 88 89 89 3F 83
340  D8 E3 D3 D4 D5 D5 D6 D6 D7 5D 5B D8 D9 D9 DA 52
350  5D D3 5D 5E 5F 5F 61 61 62 63 64 64 65 5E 5F 61
360  30 62 63 54 65 66 10 72 72 73 6B 6C 6D 6E 6F 70
370  71 72 73 74 13 00 00 00 00 00 00 00 00 00 00 00
380  C0 E1 C1 84 85 86 87 88 89 8A 82 00 00 00 00 00
390  00 00 00 00 00 00 00 00 00 00 00 00 00 00 00 00
3A0  00 00 00 00 00 00 00 00 00 00 00 00 00 00 00 00
3B0  00 00 00 00 00 00 00 00 00 00 00 00 00 00 00 00
3C0  5B 77 00 00 00 00 00 6B 6C 6C 6D 6E 6E 6F 6F 70
3D0  71 D2 D3 D4 D5 D6 D7 D8 D9 DA DB C7 52 00 00 00
3E0  00 E3 00 00 00 00 00 00 00 00 00 00 00 00 00 00
3F0  00 00 00 00 00 00 00 00 00 00 00 00 00 00 00 00
400  0A 40 60 61 05 06 07 08 09 0A 0B 0C 0D 01 0F 02
410  11 80 13 03 15 81 17 18 19 1A 1B 1C 1D 1E 1F A0
```

```
420 00 00 00 00 00 00 00 00 00 00 00 00 00 00 00 00
430 00 00 00 00 00 00 00 00 00 00 00 00 00 00 00 00
440 43 44 62 04 45 46 47 48 49 4A 4B 4C 0E 4E 4F 50
450 51 52 53 54 55 10 57 58 59 5A 5B 5C 5D 5E 12 C4
460 4D 5F 16 00 00 00 00 00 00 00 00 00 00 00 00 00
470 00 00 00 00 00 00 00 00 00 00 00 00 00 00 00 00
480 C0 C0 E0 84 85 86 87 88 89 8A 0A 00 00 00 00 00
490 00 00 00 00 00 00 00 00 00 00 00 00 00 00 00 00
4A0 C2 00 00 00 00 00 00 00 00 00 00 00 00 00 00 00
4B0 00 00 00 00 00 00 00 00 00 00 00 00 00 00 00 00
4C0 43 56 5F 44 C5 C6 C7 C8 C9 CA CB 14 16 00 00 00
4D0 00 00 00 00 00 00 00 00 00 00 00 00 00 00 00 00
4E0 CC 00 00 00 00 00 00 00 00 00 00 00 00 00 00 00
4F0 00 00 00 00 00 00 00 00 00 00 00 00 00 00 00 00
500 0A 41 42 42 05 06 07 08 09 0A 0B 0C 0D 01 0F 02
510 11 80 13 03 15 81 17 18 19 1A 1B 1C 1D 1E 1F 82
520 00 00 00 00 00 00 00 00 00 00 00 00 00 00 00 00
530 00 00 00 00 00 00 00 00 00 00 00 00 00 00 00 00
540 43 44 62 04 45 46 47 48 49 4A 4B 4C 0E 4E 4F 50
550 51 52 53 54 55 10 57 58 59 5A 5B 5C 5D 5E 12 C4
560 4D 5F 16 00 00 00 00 00 00 00 00 00 00 00 00 00
570 00 00 00 00 00 00 00 00 00 00 00 00 00 00 00 00
580 C1 C3 E0 84 85 86 87 88 89 8A 0A 00 00 00 00 00
590 00 00 00 00 00 00 00 00 00 00 00 00 00 00 00 00
5A0 C2 00 00 00 00 00 00 00 00 00 00 00 00 00 00 00
5B0 00 00 00 00 00 00 00 00 00 00 00 00 00 00 00 00
5C0 43 56 5F 44 C5 C6 C7 C8 C9 CA CB 14 16 00 00 00
5D0 00 00 00 00 00 00 00 00 00 00 00 00 00 00 00 00
5E0 CC 00 00 00 00 00 00 00 00 00 00 00 00 00 00 00
5F0 00 00 00 00 00 00 00 00 00 00 00 00 00 00 00 00
600 0A 40 60 61 05 06 07 08 09 0A 0B 0C 0D 01 0F 02
610 11 80 13 03 15 81 17 18 19 1A 1B 1C 1D 1E 1F A0
620 00 00 00 00 00 00 00 00 00 00 00 00 00 00 00 00
630 00 00 00 00 00 00 00 00 00 00 00 00 00 00 00 00
640 43 44 62 04 45 46 47 48 49 4A 4B 4C 0E 4E 4F 50
650 51 52 53 54 55 10 57 58 59 5A 5B 5C 5D 5E 12 C4
660 4D 5F 16 00 00 00 00 00 00 00 00 00 00 00 00 00
670 00 00 00 00 00 00 00 00 00 00 00 00 00 00 00 00
680 C0 C0 E0 84 85 86 87 88 89 8A 0A 00 00 00 00 00
690 00 00 00 00 00 00 00 00 00 00 00 00 00 00 00 00
6A0 C2 00 00 00 00 00 00 00 00 00 00 00 00 00 00 00
6B0 00 00 00 00 00 00 00 00 00 00 00 00 00 00 00 00
6C0 43 56 5F 44 C5 C6 C7 C8 C9 CA CB 14 16 00 00 00
6D0 00 00 00 00 00 00 00 00 00 00 00 00 00 00 00 00
6E0 CC 00 00 00 00 00 00 00 00 00 00 00 00 00 00 00
6F0 00 00 00 00 00 00 00 00 00 00 00 00 00 00 00 00
700 0A 41 42 42 05 06 07 08 09 0A 0B 0C 0D 01 0F 02
710 11 80 13 03 15 81 17 18 19 1A 1B 1C 1D 1E 1F 82
720 00 00 00 00 00 00 00 00 00 00 00 00 00 00 00 00
730 00 00 00 00 00 00 00 00 00 00 00 00 00 00 00 00
740 43 44 62 04 45 46 47 48 49 4A 4B 4C 0E 4E 4F 50
750 51 52 53 54 55 10 57 58 59 5A 5B 5C 5D 5E 12 C4
760 4D 5F 16 00 00 00 00 00 00 00 00 00 00 00 00 00
770 00 00 00 00 00 00 00 00 00 00 00 00 00 00 00 00
780 C1 C3 F0 84 85 86 87 88 89 8A 0A 00 00 00 00 00
790 00 00 00 00 00 00 00 00 00 00 00 00 00 00 00 00
7A0 C2 00 00 00 00 00 00 00 00 00 00 00 00 00 00 00
```

```
7B0 00 00 00 00 00 00 00 00 00 00 00 00 00 00 00 00
7C0 43 55 5F 44 C5 C6 C7 C8 C9 CA CB 14 16 00 00 00
7D0 00 00 00 00 00 00 00 00 00 00 00 00 00 00 00 00
7E0 CC 00 00 00 00 00 00 00 00 00 00 00 00 00 00 00
7F0 00 00 00 00 00 00 00 00 00 00 00 00 00 00 00 00
```

GCR14 STATE MACHINE CODE

```
000 60 60 03 40 42 41 07 43 44 45 0B 46 47 48 01 10
010 50 50 50 80 02 04 17 05 11 81 82 06 12 08 1F 84
020 21 31 23 24 25 26 27 28 29 2A 2B 2C 20 2E 09 0A
030 31 32 33 34 35 36 37 38 39 3A 0E 0C 3D 0D 85 85
040 58 66 75 77 73 CD D3 D6 DE 65 7A 4C 4D 4E 4F 51
050 51 52 53 54 55 8B 57 8C 59 5A 8D 5C 5D 5E 5F 61
060 30 62 63 64 91 16 67 68 92 6A 6B 6C 6D 6E 6F 70
070 71 72 93 74 94 76 95 78 79 96 7B 7C 7D 7E 7F C7
080 C0 C1 83 C2 C3 C4 87 C5 C6 8A 88 13 14 0F 8F 90
090 D0 15 18 19 1A 1B 1C 1D 2F 3B 3E 3F 00 00 00 00
0A0 00 00 00 00 00 00 00 00 00 00 00 00 00 00 00 00
0B0 00 00 00 00 00 00 00 00 00 00 00 00 00 00 00 00
0C0 56 73 77 CD D6 D3 DE C8 97 CA 1E CC 2D CE CF 8E
0D0 51 D2 98 D4 D5 99 D7 D8 D9 DA DB 49 DD 3C DF E0
0E0 9A E2 E3 E4 E5 45 E7 9B E9 89 00 00 00 00 00 00
0F0 00 00 00 00 00 00 00 00 00 00 00 00 00 00 00 00
100 60 4A 41 40 05 06 07 08 09 0A 0B 0C 0D 0E 0F 01
110 04 14 51 1E 15 16 17 18 19 1A 1B 1C 1D 80 1F 20
120 21 22 23 24 25 26 27 28 29 02 2B 2C 2D 2E 2F 31
130 42 32 33 34 35 81 37 38 39 3A 3B 3C 3D 3E 3F 83
140 D1 E6 43 44 45 46 47 48 49 61 4B 4C 4D 4E C7 50
150 65 52 53 54 55 56 57 58 59 5A 5B 5C 5D 5E 5F 42
160 30 62 63 64 12 66 67 68 69 6A 6B 6C 6D 6E 10 70
170 71 72 36 74 75 76 77 78 79 7A 7B 7C 7D 7E 13 00
180 C0 E7 C1 84 85 03 87 88 89 8A 8B 8C 8D 8E 8F 90
190 82 00 00 00 00 00 00 00 00 00 00 00 00 00 00 00
1A0 00 00 00 00 00 00 00 00 00 00 00 00 00 00 00 00
1B0 00 00 00 00 00 00 00 00 00 00 00 00 00 00 00 00
1C0 4B 69 00 00 00 00 00 C8 C9 CA CB CC CD CE CF D0
1D0 6F D2 D3 D4 D5 D6 D7 D8 4B 00 00 00 00 00 00 00
1E0 00 00 00 00 00 00 00 E6 00 00 00 00 00 00 00 00
1F0 00 00 00 00 00 00 00 00 00 00 00 00 00 00 00 00
200 60 2B 41 41 42 41 45 45 44 45 48 48 3E 48 2A 92
210 18 50 8F 91 05 04 17 05 11 97 84 09 8E 08 1F 84
220 22 23 23 24 25 26 27 28 29 2A 2B 2C 20 2E 09 0D
230 23 23 24 25 26 26 27 27 28 29 2A 9A 3D 0D 85 88
240 66 66 CC CD CA CD DE E2 DE 65 7A 5D 5D 5E 5F 61
250 D2 61 62 62 63 64 16 16 66 67 68 5C 5D 5E 5F 61
260 30 62 63 64 91 16 67 68 92 7B 7B 7C 7D 7E 7E 7F
270 7F C7 C8 1E 1E 2D 2D CD CE CF 7B 7C 7D 7E 7F C7
280 15 1D C3 C3 C3 C4 C6 C6 C6 8A 88 91 17 92 8F 90
290 D0 15 18 97 1F 2E 8E 1D 3D 9A 3E 8A 00 00 00 00
2A0 00 00 00 00 00 00 00 00 00 00 00 00 00 00 00 00
2B0 00 00 00 00 00 00 00 00 00 00 00 00 00 00 00 00
2C0 65 CA CD CD E2 DE DE C8 97 CA 1E CC 2D CE CF 8E
2D0 D2 3C 3C DE DF E0 E3 E3 E4 E5 45 45 DD 3C DF E0
2E0 9A E2 E3 E4 E5 45 89 89 E9 89 00 00 00 00 00 00
2F0 00 00 00 00 00 00 00 00 00 00 00 00 00 00 00 00
```

```
300 E0 1D 85 90 15 15 16 17 18 18 19 19 1A 1B 1C 1C
310 14 14 51 2B 15 16 17 18 19 1A 1B 1C 1D 80 2C 2C
320 2D 2E 2F 2F 31 31 32 33 34 34 2B 2C 2D 2E 2F 31
330 65 32 33 34 35 81 87 88 88 89 8A 8B 83 8C 8C 8D
340 DD E9 65 66 67 68 68 69 69 6A 5C 4C 4D 4E C7 50
350 65 D3 D3 D4 D5 D6 D6 D7 D7 D8 4B 4C 4C 4D 50 65
360 30 6B 6C 6C 6D 66 67 68 69 6A 6B 6C 6D 6E 10 7B
370 7C 7C 7D 74 75 76 77 78 79 7A 7B 7C 7D 7E 13 00
380 C0 E7 C1 8E 8F 8F 87 88 89 8A 8B 8C 8D 8E 8F 90
390 82 00 00 00 00 00 00 00 00 00 00 00 00 00 00 00
3A0 00 00 00 00 00 00 00 00 00 00 00 00 00 00 00 00
3B0 00 00 00 00 00 00 00 00 00 00 00 00 00 00 00 00
3C0 5C 7A 00 00 00 00 00 74 75 75 76 77 78 78 79 79
3D0 7A D2 D3 D4 D5 D6 D7 D8 4B 00 00 00 00 00 00 00
3E0 00 00 00 00 00 00 00 E9 00 00 00 00 00 00 00 00
3F0 00 00 00 00 00 00 00 00 00 00 00 00 00 00 00 00
400 0B 40 60 61 05 06 07 08 09 0A 0B 0C 0D 0E 01 10
410 02 12 80 14 03 16 81 18 19 1A 1B 1C 1D 1E 1F 0B
420 00 00 00 00 00 00 00 00 00 00 00 00 00 00 00 00
430 00 00 00 00 00 00 00 00 00 00 00 00 00 00 00 00
440 43 44 62 04 45 46 47 48 49 4A 4B 4C 4D 0F 4F 50
450 51 52 53 54 55 56 57 11 59 5A 5B 5C 5D 5E 5F C4
460 4E C6 85 00 00 00 00 00 00 00 00 00 00 00 00 00
470 00 00 00 00 00 00 00 00 00 00 00 00 00 00 00 00
480 C0 C0 00 00 00 86 87 88 89 8A 8B 8C 8D 8E 8F A0
490 F0 00 00 00 00 00 00 00 00 00 00 00 00 00 00 00
4A0 C2 00 00 00 00 00 00 00 00 00 00 00 00 00 00 00
4B0 00 00 00 00 00 00 00 00 00 00 00 00 00 00 00 00
4C0 43 58 C6 44 C5 13 C7 C8 C9 CA CB CC CD CE CF 15
4D0 85 00 00 00 00 00 00 00 00 00 00 00 00 00 00 00
4E0 00 00 00 00 00 00 00 00 00 00 00 00 00 00 00 00
4F0 D0 00 00 00 00 00 00 00 00 00 00 00 00 00 00 00
500 0B 41 42 42 05 06 07 08 09 0A 0B 0C 0D 0E 01 10
510 02 12 80 14 03 16 81 18 19 1A 1B 1C 1D 1E 1F 0B
520 00 00 00 00 00 00 00 00 00 00 00 00 00 00 00 00
530 00 00 00 00 00 00 00 00 00 00 00 00 00 00 00 00
540 43 44 62 04 45 46 47 48 49 4A 4B 4C 4D 0F 4F 50
550 51 52 53 54 55 56 57 11 59 5A 5B 5C 5D 5E 5F C4
560 4E C6 85 00 00 00 00 00 00 00 00 00 00 00 00 00
570 00 00 00 00 00 00 00 00 00 00 00 00 00 00 00 00
580 C1 C3 00 00 00 86 87 88 89 8A 8B 8C 8D 8E 8F 90
590 F0 00 00 00 00 00 00 00 00 00 00 00 00 00 00 00
5A0 C2 00 00 00 00 00 00 00 00 00 00 00 00 00 00 00
5B0 00 00 00 00 00 00 00 00 00 00 00 00 00 00 00 00
5C0 43 58 C6 44 C5 13 C7 C8 C9 CA CB CC CD CE CF 15
5D0 85 00 00 00 00 00 00 00 00 00 00 00 00 00 00 00
5E0 00 00 00 00 00 00 00 00 00 00 00 00 00 00 00 00
5F0 D0 00 00 00 00 00 00 00 00 00 00 00 00 00 00 00
600 0B 40 60 61 05 06 07 08 09 0A 0B 0C 0D 0E 01 10
610 02 12 80 14 03 16 81 18 19 1A 1B 1C 1D 1E 1F 0B
620 00 00 00 00 00 00 00 00 00 00 00 00 00 00 00 00
630 00 00 00 00 00 00 00 00 00 00 00 00 00 00 00 00
640 43 44 62 04 45 46 47 48 49 4A 4B 4C 4D 0F 4F 50
650 51 52 53 54 55 56 57 11 59 5A 5B 5C 5D 5E 5F C4
660 4E C6 85 00 00 00 00 00 00 00 00 00 00 00 00 00
670 00 00 00 00 00 00 00 00 00 00 00 00 00 00 00 00
680 C0 C0 00 00 00 86 87 88 89 8A 8B 8C 8D 8E 8F A0
```

```
690 F0 00 00 00 00 00 00 00 00 00 00 00 00 00 00 00
6A0 C2 00 00 00 00 00 00 00 00 00 00 00 00 00 00 00
6B0 00 00 00 00 00 00 00 00 00 00 00 00 00 00 00 00
6C0 43 58 C6 44 C5 13 C7 C8 C9 CA CB CC CD CE CF 15
6D0 85 00 00 00 00 00 00 00 00 00 00 00 00 00 00 00
6E0 00 00 00 00 00 00 00 00 00 00 00 00 00 00 00 00
6F0 D0 00 00 00 00 00 00 00 00 00 00 00 00 00 00 00
700 0B 41 42 42 05 06 07 08 09 0A 0B 0C 0D 0E 01 10
710 02 12 80 14 03 15 81 18 19 1A 1B 1C 1D 1E 1F 0B
720 00 00 00 00 00 00 00 00 00 00 00 00 00 00 00 00
730 00 00 00 00 00 00 00 00 00 00 00 00 00 00 00 00
740 43 44 62 04 45 46 47 48 49 4A 4B 4C 4D 0F 4F 50
750 51 52 53 54 55 56 57 11 59 5A 5B 5C 5D 5E 5F C4
760 4E C6 85 00 00 00 00 00 00 00 00 00 00 00 00 00
770 00 00 00 00 00 00 00 00 00 00 00 00 00 00 00 00
780 C1 C3 00 00 00 86 87 88 89 8A 8B 8C 8D 8E 8F 90
790 F0 00 00 00 00 00 00 00 00 00 00 00 00 00 00 00
7A0 C2 00 00 00 00 00 00 00 00 00 00 00 00 00 00 00
7B0 00 00 00 00 00 00 00 00 00 00 00 00 00 00 00 00
7C0 43 58 C6 44 C5 13 C7 C8 C9 CA CB CC CD CE CF 15
7D0 85 00 00 00 00 00 00 00 00 00 00 00 00 00 00 00
7E0 00 00 00 00 00 00 00 00 00 00 00 00 00 00 00 00
7F0 D0 00 00 00 00 00 00 00 00 00 00 00 00 00 00 00

GCR15 STATE MACHINE CODE 000 60 02 40 42 41 06 43 44 45 0A 46 47 48 13 0F 10
010 50 50 50 80 01 16 03 18 04 1A 11 1C 81 82 1F 20
020 60 22 31 24 25 26 27 28 29 2A 2B 2C 2D 2E 21 05
030 31 32 33 34 35 36 37 38 39 3A 1E 3C 12 3E 07 89
040 58 66 75 77 73 CD D3 D6 DE 65 7A 4C 4D 4E 4F 51
050 51 52 53 54 55 99 57 9A 59 5A 9B 5C 5D 5E 5F 61
060 30 62 63 64 9C 17 67 68 9D 6A 6B 6C 6D 6E 6F 70
070 71 72 9E 74 9F 76 A0 78 79 A1 7B 7C 7D 7E 7F C7
080 C0 C1 83 C2 C3 C4 87 C5 C6 84 8B 08 09 91 8F 90
090 D0 0B 93 0C 95 85 86 98 88 0D 14 0E 15 19 1B 1D
0A0 2F 3B 3D 8E 9C 8D 94 96 00 00 00 00 00 00 00 00
0B0 00 00 00 00 00 00 00 00 00 00 00 00 00 00 00 00
0C0 56 73 77 CD D6 46 48 C8 A2 CA 3F CC 8A CE CF A3
0D0 51 D2 A4 D4 D5 A5 D7 D8 D9 DA DB 43 DD 92 DF E0
0E0 A6 E2 E3 E4 E5 45 E7 A7 E9 97 00 00 00 00 00 00
0F0 00 00 00 00 00 00 00 00 00 00 00 00 00 00 00 00
100 60 4A 41 40 05 06 07 08 09 0A 0B 0C 0D 0E 0F 14
110 04 15 51 20 01 16 17 18 19 1A 1B 1C 1D 1E 1F 80
120 21 22 23 24 25 26 27 28 29 2A 2B 2C 02 2E 2F 31
130 43 32 33 34 35 36 37 38 39 81 3B 3C 3D 3E 3F 83
140 D1 E6 43 44 45 46 47 48 49 61 4B 4C 4D 4E C7 50
150 67 52 53 54 55 56 57 58 59 5A 5B 5C 5D 5E 5F 42
160 30 62 63 64 65 66 12 68 69 6A 6B 6C 6D 6E 6F 70
170 71 10 73 74 75 76 3A 78 79 7A 7B 7C 7D 7E 7F C2
180 C0 E7 C1 84 85 86 87 88 89 8A 03 8C 8D 8E 8F 90
190 91 92 93 94 95 96 82 00 00 00 00 00 00 00 00 00
1A0 00 00 00 00 00 00 00 00 00 00 00 00 00 00 00 00
1B0 00 00 00 00 00 00 00 00 00 00 00 00 00 00 00 00
1C0 4B 69 C3 C4 C5 13 00 C8 C9 CA CB CC CD CE CF D0
1D0 72 D2 D3 D4 D5 D6 D7 D8 D9 4B 00 00 00 00 00 00
```

| | | | | | | | | | | | | | | | | |
|---|---|---|---|---|---|---|---|---|---|---|---|---|---|---|---|---|
| 1E0 | 00 | 00 | 00 | 00 | 00 | 00 | 00 | E5 | 00 | 00 | 00 | 00 | 00 | 00 | 00 | 00 |
| 1F0 | 00 | 00 | 00 | 00 | 00 | 00 | 00 | 00 | 00 | 00 | 00 | 00 | 00 | 00 | 00 | 00 |
| 200 | 50 | 41 | 41 | 42 | 41 | 45 | 45 | 44 | 45 | 48 | 48 | 95 | 48 | 9C | 9D | 19 |
| 210 | 1A | 50 | 8F | 15 | 04 | 16 | 03 | 18 | 04 | 1A | 11 | A2 | 3D | 84 | 2B | 2C |
| 220 | 2D | 23 | 24 | 24 | 25 | 26 | 27 | 28 | 29 | 2A | 2B | 2C | 2D | 2E | 21 | 08 |
| 230 | 24 | 24 | 25 | 26 | 27 | 27 | 28 | 28 | 29 | 2A | 2B | A3 | 8E | 3E | 07 | 89 |
| 240 | 66 | 66 | CC | CD | CA | CD | DE | E2 | DE | 65 | 7A | 5D | 5D | 5E | 5F | 61 |
| 250 | D2 | 61 | 62 | 62 | E3 | 64 | 17 | 17 | 66 | 67 | 68 | 5C | 5D | 5E | 5F | 61 |
| 260 | 30 | 62 | 63 | 64 | 9C | 17 | 67 | 68 | 9D | 7B | 7B | 7C | 7D | 7E | 7E | 7F |
| 270 | 7F | C7 | C8 | 3F | 3F | 8A | 8A | CD | CE | CF | 7B | 7C | 7D | 7E | 7F | C7 |
| 280 | 16 | 3E | C3 | C3 | C3 | C4 | C6 | C6 | C6 | 84 | 8B | 03 | 0C | A6 | 8F | 90 |
| 290 | D0 | 94 | 93 | 0C | 95 | 85 | 88 | 98 | 88 | 9C | 18 | 9D | 15 | 19 | A2 | 85 |
| 2A0 | 8B | A3 | 3D | 8E | 93 | A6 | 94 | 98 | 00 | 00 | 00 | 00 | 00 | 00 | 00 | 00 |
| 2B0 | 00 | 00 | 00 | 00 | 00 | 00 | 00 | 00 | 00 | 00 | 00 | 00 | 00 | 00 | 00 | 00 |
| 2C0 | 65 | CA | CD | CD | E2 | 48 | 48 | C8 | A2 | CA | 3F | CC | 8A | CE | CF | A3 |
| 2D0 | D2 | 92 | 92 | DE | DF | E0 | E3 | E3 | E4 | E5 | 45 | 45 | DD | 92 | DF | E0 |
| 2E0 | A6 | E3 | E3 | E4 | E5 | 45 | 97 | 97 | E9 | 97 | 00 | 00 | 00 | 00 | 00 | 00 |
| 2F0 | 00 | 00 | 00 | 00 | 00 | 00 | 00 | 00 | 00 | 00 | 00 | 00 | 00 | 00 | 00 | 00 |
| 300 | 60 | 1F | 39 | 96 | 16 | 16 | 17 | 18 | 19 | 19 | 1A | 1A | 1B | 1C | 1D | 1D |
| 310 | 15 | 15 | 51 | 2E | 1E | 16 | 17 | 18 | 19 | 1A | 1B | 1C | 1D | 1E | 1F | 80 |
| 320 | 2F | 2F | 31 | 32 | 33 | 33 | 34 | 34 | 35 | 36 | 37 | 37 | 38 | 2E | 2F | 31 |
| 330 | 67 | 32 | 33 | 34 | 35 | 36 | 37 | 38 | 39 | 81 | 8C | 8D | 8D | 8E | 8F | 90 |
| 340 | DD | E9 | 67 | 67 | 68 | 69 | 5A | 6A | 6B | 6B | 5C | 4C | 4D | 4E | C7 | 50 |
| 350 | 67 | D3 | D3 | D4 | D5 | D6 | D6 | D7 | D7 | D8 | D9 | 4B | 4B | 4C | 4D | 50 |
| 360 | 30 | 6C | 6D | 6E | 6E | 6F | 70 | 68 | 69 | 6A | 6B | 6C | 6D | 6E | 6F | 70 |
| 370 | 71 | 10 | 7F | C2 | C2 | C3 | C4 | 78 | 79 | 7A | 7B | 7C | 7D | 7E | 7F | C2 |
| 380 | C0 | E7 | C1 | 90 | 91 | 91 | 92 | 93 | 94 | 94 | 95 | 8C | 8D | 8E | 8F | 90 |
| 390 | 91 | 92 | 93 | 94 | 95 | 96 | E2 | 00 | 00 | 00 | 00 | 00 | 00 | 00 | 00 | 00 |
| 3A0 | 00 | 00 | 00 | 00 | 00 | 00 | 00 | 00 | 00 | 00 | 00 | 00 | 00 | 00 | 00 | 00 |
| 3B0 | 00 | 00 | 00 | 00 | 00 | 00 | 00 | 00 | 00 | 00 | 00 | 00 | 00 | 00 | 00 | 00 |
| 3C0 | 5C | 7A | C3 | C4 | C5 | 13 | 00 | 78 | 79 | 79 | 7A | 7B | 7C | 7C | 7D | 7D |
| 3D0 | 7E | D2 | D3 | D4 | D5 | D6 | D7 | D8 | D9 | 4B | 00 | 00 | 00 | 00 | 00 | 00 |
| 3E0 | 00 | 00 | 00 | 00 | 00 | 00 | 00 | E9 | 00 | 00 | 00 | 00 | 00 | 00 | 00 | 00 |
| 3F0 | 00 | 00 | 00 | 00 | 00 | 00 | 00 | 00 | 00 | 00 | 00 | 00 | 00 | 00 | 00 | 00 |
| 400 | 1C | 40 | 60 | 61 | 05 | 06 | 07 | 08 | 09 | 0A | 0B | 0C | 0D | 0E | 0F | 01 |
| 410 | 11 | 12 | 02 | 14 | 15 | 80 | 17 | 18 | 03 | 1A | 1B | 81 | 1D | 1E | 1F | 82 |
| 420 | 00 | 00 | 00 | 00 | 00 | 00 | 00 | 00 | 00 | 00 | 00 | 00 | 00 | 00 | 00 | 00 |
| 430 | 00 | 00 | 00 | 00 | 00 | 00 | 00 | 00 | 00 | 00 | 00 | 00 | 00 | 00 | 00 | 00 |
| 440 | 43 | 44 | 62 | 04 | 45 | 46 | 47 | 48 | 49 | 4A | 4B | 4C | 4D | 10 | 4F | 50 |
| 450 | 51 | 52 | 53 | 54 | 55 | 56 | 57 | 13 | 59 | 5A | 5B | 5C | 5D | 5E | 5F | C4 |
| 460 | 4E | C6 | 84 | 00 | 00 | 00 | 00 | 00 | 00 | 00 | 00 | 00 | 00 | 00 | 00 | 00 |
| 470 | 00 | 00 | 00 | 00 | 00 | 00 | 00 | 00 | 00 | 00 | 00 | 00 | 00 | 00 | 00 | 00 |
| 480 | C0 | C0 | 83 | 91 | 85 | 86 | 87 | 88 | 89 | 8A | 8B | 8C | 8D | 8E | 8F | A0 |
| 490 | F0 | 92 | 93 | 08 | 00 | 00 | 00 | 00 | 00 | 00 | 00 | 00 | 00 | 00 | 00 | 00 |
| 4A0 | C2 | 00 | 00 | 00 | 00 | 00 | 00 | 00 | 00 | 00 | 00 | 00 | 00 | 00 | 00 | 00 |
| 4B0 | 00 | 00 | 00 | 00 | 00 | 00 | 00 | 00 | 00 | 00 | 00 | 00 | 00 | 00 | 00 | 00 |
| 4C0 | 43 | 58 | C5 | 44 | C5 | 16 | C7 | C8 | C9 | CA | CB | CC | CD | CE | CF | 19 |
| 4D0 | 84 | 00 | 00 | 00 | 00 | 00 | 00 | 00 | 00 | 00 | 00 | 00 | 00 | 00 | 00 | 00 |
| 4E0 | 00 | 00 | 00 | 00 | 00 | 00 | 00 | 00 | 00 | 00 | 00 | 00 | 00 | 00 | 00 | 00 |
| 4F0 | D0 | 00 | 00 | 00 | 00 | 00 | 00 | 00 | 00 | 00 | 00 | 00 | 00 | 00 | 00 | 00 |
| 500 | 1C | 41 | 42 | 42 | 05 | 06 | 07 | 08 | 09 | 0A | 0B | 0C | 0D | 0E | 0F | 01 |
| 510 | 11 | 12 | 02 | 14 | 15 | 80 | 17 | 18 | 03 | 1A | 1B | 81 | 1D | 1E | 1F | 82 |
| 520 | 00 | 00 | 00 | 00 | 00 | 00 | 00 | 00 | 00 | 00 | 00 | 00 | 00 | 00 | 00 | 00 |
| 530 | 00 | 00 | 00 | 00 | 00 | 00 | 00 | 00 | 00 | 00 | 00 | 00 | 00 | 00 | 00 | 00 |
| 540 | 43 | 44 | 62 | 04 | 45 | 46 | 47 | 48 | 49 | 4A | 4B | 4C | 4D | 10 | 4F | 50 |
| 550 | 51 | 52 | 53 | 54 | 55 | 56 | 57 | 13 | 59 | 5A | 5B | 5C | 5D | 5E | 5F | C4 |
| 560 | 4E | C6 | 84 | 00 | 00 | 00 | 00 | 00 | 00 | 00 | 00 | 00 | 00 | 00 | 00 | 00 |

```
570 00 00 00 00 00 00 00 00 00 00 00 00 00 00 00 00
580 C1 C3 83 91 85 86 87 88 89 8A 8B 8C 8D 8E 8F 90
590 F0 92 93 08 00 00 00 00 00 00 00 00 00 00 00 00
5A0 C2 00 00 00 00 00 00 00 00 00 00 00 00 00 00 00
5B0 00 00 00 00 00 00 00 00 00 00 00 00 00 00 00 00
5C0 43 58 C6 44 C5 16 C7 C8 C9 CA CB CC CD CE CF 19
5D0 84 00 00 00 00 00 00 00 00 00 00 00 00 00 00 00
5E0 00 00 00 00 00 00 00 00 00 00 00 00 00 00 00 00
5F0 D0 00 00 00 00 00 00 00 00 00 00 00 00 00 00 00
600 1C 40 60 61 05 06 07 08 09 0A 0B 0C 0D 0E 0F 01
610 11 12 02 14 15 80 17 18 03 1A 1B 81 1D 1E 1F 82
620 00 00 00 00 00 00 00 00 00 00 00 00 00 00 00 00
630 00 00 00 00 00 00 00 00 00 00 00 00 00 00 00 00
640 43 44 62 04 45 46 47 48 49 4A 4B 4C 4D 10 4F 50
650 51 52 53 54 55 56 57 13 59 5A 5B 5C 5D 5E 5F C4
660 4E C6 84 00 00 00 00 00 00 00 00 00 00 00 00 00
670 00 00 00 00 00 00 00 00 00 00 00 00 00 00 00 00
680 C0 C0 83 91 85 86 87 88 89 8A 8B 8C 8D 8E 8F A0
690 F0 92 93 08 00 00 00 00 00 00 00 00 00 00 00 00
6A0 C2 00 00 00 00 00 00 00 00 00 00 00 00 00 00 00
6B0 00 00 00 00 00 00 00 00 00 00 00 00 00 00 00 00
6C0 43 58 C6 44 C5 16 C7 C8 C9 CA CB CC CD CE CF 19
6D0 84 00 00 00 00 00 00 00 00 00 00 00 00 00 00 00
6E0 00 00 00 00 00 00 00 00 00 00 00 00 00 00 00 00
6F0 D0 00 00 00 00 00 00 00 00 00 00 00 00 00 00 00
700 1C 41 42 42 05 06 07 08 09 0A 0B 0C 0D 0E 0F 01
710 11 12 02 14 15 80 17 18 03 1A 1B 81 1D 1E 1F 82
720 00 00 00 00 00 00 00 00 00 00 00 00 00 00 00 00
730 00 00 00 00 00 00 00 00 00 00 00 00 00 00 00 00
740 43 44 62 04 45 46 47 48 49 4A 4B 4C 4D 10 4F 50
750 51 52 53 54 55 56 57 13 59 5A 5B 5C 5D 5E 5F C4
760 4E C6 84 00 00 00 00 00 00 00 00 00 00 00 00 00
770 00 00 00 00 00 00 00 00 00 00 00 00 00 00 00 00
780 C1 C3 83 91 85 86 87 88 89 8A 8B 8C 8D 8E 8F 90
790 F0 92 93 08 00 00 00 00 00 00 00 00 00 00 00 00
7A0 C2 00 00 00 00 00 00 00 00 00 00 00 00 00 00 00
7B0 00 00 00 00 00 00 00 00 00 00 00 00 00 00 00 00
7C0 43 58 C6 44 C5 16 C7 C8 C9 CA CB CC CD CE CF 19
7D0 84 00 00 00 00 00 00 00 00 00 00 00 00 00 00 00
7E0 00 00 00 00 00 00 00 00 00 00 00 00 00 00 00 00
7F0 D0 00 00 00 00 00 00 00 00 00 00 00 00 00 00 00
```

GCR16 STATE MACHINE CODE

```
000 60 02 40 42 41 06 43 44 45 0A 46 47 48 13 0F 10
010 50 50 50 80 01 16 03 18 04 1A 11 1C 81 82 1F 20
020 60 22 31 24 25 26 27 28 29 2A 2B 2C 2D 2E 2F 21
030 31 32 33 34 35 36 37 38 39 3A 3B 1E 05 3E 12 89
040 5A 68 79 7C 76 D8 D9 DC E5 67 7F 4C 4D 4E 4F 51
050 42 52 53 54 55 56 9B 58 59 9C 5B 5C 9D 5E 5F 61
060 30 62 63 64 65 66 9E 17 69 6A 9F EC 6D 6E 6F 70
070 71 72 73 74 75 A0 77 78 A1 7A 7B A2 7D 7E A3 C7
080 C0 C1 83 C2 C4 86 C5 C6 C3 07 8B 88 8D 08 8F 90
090 D0 09 93 0B 95 0C 97 84 85 9A 87 0D 14 0E 15 19
0A0 1B 1D 3C 3D 3F 8E 91 92 96 98 00 00 00 00 00 00
0B0 00 00 00 00 00 00 00 00 00 00 00 00 00 00 00 00
```

```
0C0 57 76 7C D3 DC D9 E5 C8 C9 CA CB CC CD A4 CF 8A
0D0 42 D2 8C D4 D5 A5 D7 D8 A6 DA DB A7 DD DE DF E0
0E0 E1 E2 43 E4 94 E6 E7 A8 E9 EA EB EC 45 EE EF A9
0F0 F1 99 00 00 00 00 00 00 00 00 00 00 00 00 00 00
100 60 4A 41 40 05 06 07 08 09 0A 0B 0C 0D 0E 0F 14
110 04 16 42 21 15 01 17 18 19 1A 1B 1C 1D 1E 1F 20
120 80 22 23 24 25 26 27 28 29 2A 2B 2C 2D 2E 02 31
130 50 32 33 34 35 36 37 38 39 3A 3B 81 3D 3E 3F 83
140 D6 ED 43 44 45 46 47 48 49 52 4B 4C 4D 4E 4F 50
150 56 64 53 54 55 4B 57 58 59 5A 5B 5C 5D 5E 5F 61
160 30 62 63 12 65 66 67 68 69 6A 6B 6C 6D 6E 10 70
170 71 72 73 74 3C 76 77 78 79 7A 7B 7C 7D 7E 7F C2
180 C0 EF C1 84 85 86 87 88 89 8A 8B 8C 8D 03 8F 90
190 91 92 93 94 95 96 97 98 99 82 00 00 00 00 00 00
1A0 00 00 00 00 00 00 00 00 00 00 00 00 00 00 00 00
1B0 00 00 00 00 00 00 00 00 00 00 00 00 00 00 00 00
1C0 4B 6B C3 13 00 00 00 C8 C9 CA CB CC CD CE CF D0
1D0 6F D2 D3 D4 D5 D6 D7 D8 D9 DA DB DC DD C7 51 00
1E0 00 00 00 00 00 00 00 00 00 00 00 00 00 00 00 ED
1F0 00 00 00 00 00 00 00 00 00 00 00 00 00 00 00 00
200 60 41 41 42 41 45 45 44 45 48 48 97 48 9E 9F 19
210 1A 50 8F 15 04 16 03 18 04 1A 11 A4 3F 88 2C 2D
220 2E 23 24 24 25 26 27 28 29 2A 2B 2C 2D 2E 2F 21
230 24 25 25 26 27 28 28 29 29 2A 2B 2C 08 A5 8E 89
240 68 68 D1 D3 CE D3 E5 E8 E5 67 7F 5E 5F 5F 61 62
250 D1 63 63 64 64 65 66 67 17 17 68 69 6A 5E 5F 61
260 30 62 63 64 65 66 9E 17 69 6A 9F 7F C7 C7 C8 C9
270 CA CA CB CB CC CD CF 8A 8A D2 8C 8C D3 D4 D5 C7
280 16 89 C3 C3 C4 C6 C6 C6 C3 07 8B 88 8D 08 8F 90
290 D0 0C A8 96 95 0C 97 84 87 9A 87 9E 18 9F 15 19
2A0 A4 8B 8D A5 3F 8E 95 A8 96 9A 00 00 00 00 00 00
2B0 00 00 00 00 00 00 00 00 00 00 00 00 00 00 00 00
2C0 49 CE D3 D3 E8 E5 E5 C8 C9 CA CB CC CD A4 CF 8A
2D0 D1 D2 8C D4 D5 A5 E4 94 94 E5 E6 E7 E9 EA EA EB
2E0 EC 45 45 E4 94 E6 E7 A8 E9 EA EB EC 45 F1 99 99
2F0 F1 99 00 00 00 00 00 00 00 00 00 00 00 00 00 00
300 60 20 3B 99 16 17 17 18 19 1A 1A 1B 1B 1C 1D 1E
310 11 16 42 2F 1E 1F 17 18 19 1A 1B 1C 1D 1E 1F 20
320 80 31 32 32 33 34 35 35 36 36 37 38 39 39 3A 31
330 51 32 33 34 35 36 37 38 39 3A 3B 81 8E 8F 90 90
340 E8 F0 D2 D3 D3 D4 D5 D5 D6 D7 5D DA DB DC DE 51
350 64 64 D7 D8 D9 DA 64 65 66 67 67 68 68 69 6A 6B
360 30 6B 6C 6D 65 66 67 68 69 6A 6B 6C 6D 6E 10 7C
370 7D 7E 7E 7F C2 76 77 78 79 7A 7B 7C 7D 7E 7F C2
380 C0 EF C1 91 92 93 93 94 94 95 96 97 97 98 8F 90
390 91 92 93 94 95 96 97 98 99 82 00 00 00 00 00 00
3A0 00 00 00 00 00 00 00 00 00 00 00 00 00 00 00 00
3B0 00 00 00 00 00 00 00 00 00 00 00 00 00 00 00 00
3C0 5D 4A C3 13 00 00 00 75 76 77 77 78 79 7A 7A 7B
3D0 7B D2 D3 D4 D5 D5 D7 D8 D9 DA DB DC DD C7 51 00
3E0 00 00 00 00 00 00 00 00 00 00 00 00 00 00 00 F0
3F0 00 00 00 00 00 00 00 00 00 00 00 00 00 00 00 00
400 0B 40 60 61 05 06 07 08 09 0A 0B 0C 0D 0E 0F 01
410 11 12 02 14 15 30 17 18 03 1A 1B 81 1D 1E 1F 83
420 00 00 00 00 00 00 00 00 00 00 00 00 00 00 00 00
430 00 00 00 00 00 00 00 00 00 00 00 00 00 00 00 00
440 43 45 62 44 04 46 47 48 49 4A 4B 4C 4D 4E 4F 10
```

```
450 51 52 53 54 55 56 57 58 59 5A 13 5C 5D 5E 5F C4
460 50 CA D6 00 00 00 00 00 00 00 00 00 00 00 00 00
470 00 00 00 00 00 00 00 00 00 00 00 00 00 00 00 00
480 C0 C0 E0 84 85 86 87 88 89 8A A0 8C 8D 8E 8F 90
490 91 92 93 94 0B 00 00 00 00 00 00 00 00 00 00 00
4A0 C2 00 00 00 00 00 00 00 00 00 00 00 00 00 00 00
4B0 00 00 00 00 00 00 00 00 00 00 00 00 00 00 00 00
4C0 43 5B CA 45 C5 C6 C7 C8 C9 16 CB CC CD CE CF D0
4D0 D1 D2 D3 D4 19 D6 1C 00 00 00 00 00 00 00 00 00
4E0 D5 00 00 00 00 00 00 00 00 00 00 00 00 00 00 00
4F0 00 00 00 00 00 00 00 00 00 00 00 00 00 00 00 00
500 0B 41 42 42 05 06 07 08 09 0A 0B 0C 0D 0E 0F 01
510 11 12 02 14 15 80 17 18 03 1A 1B 81 1D 1E 1F 83
520 00 00 00 00 00 00 00 00 00 00 00 00 00 00 00 00
530 00 00 00 00 00 00 00 00 00 00 00 00 00 00 00 00
540 43 45 62 44 04 46 47 48 49 4A 4B 4C 4D 4E 4F 10
550 51 52 53 54 55 56 57 58 59 5A 13 5C 5D 5E 5F C4
560 50 CA D6 00 00 00 00 00 00 00 00 00 00 00 00 00
570 00 00 00 00 00 00 00 00 00 00 00 00 00 00 00 00
580 C1 C3 E0 84 85 86 87 88 89 8A 82 8C 8D 8E 8F 90
590 91 92 93 94 0B 00 00 00 00 00 00 00 00 00 00 00
5A0 C2 00 00 00 00 00 00 00 00 00 00 00 00 00 00 00
5B0 00 00 00 00 00 00 00 00 00 00 00 00 00 00 00 00
5C0 43 5B CA 45 C5 C6 C7 C8 C9 16 CB CC CD CE CF D0
5D0 D1 D2 D3 D4 19 D6 1C 00 00 00 00 00 00 00 00 00
5E0 D5 00 00 00 00 00 00 00 00 00 00 00 00 00 00 00
5F0 00 00 00 00 00 00 00 00 00 00 00 00 00 00 00 00
600 0B 40 60 61 05 06 07 08 09 0A 0B 0C 0D 0E 0F 01
610 11 12 02 14 15 80 17 18 03 1A 1B 81 1D 1E 1F 83
620 00 00 00 00 00 00 00 00 00 00 00 00 00 00 00 00
630 00 00 00 00 00 00 00 00 00 00 00 00 00 00 00 00
640 43 45 62 44 04 46 47 48 49 4A 4B 4C 4D 4E 4F 10
650 51 52 53 54 55 56 57 58 59 5A 13 5C 5D 5E 5F C4
660 50 CA D6 00 00 00 00 00 00 00 00 00 00 00 00 00
670 00 00 00 00 00 00 00 00 00 00 00 00 00 00 00 00
680 C0 C0 E0 84 85 86 87 88 89 8A A0 8C 8D 8E 8F 90
690 91 92 93 94 0B 00 00 00 00 00 00 00 00 00 00 00
6A0 C2 00 00 00 00 00 00 00 00 00 00 00 00 00 00 00
6B0 00 00 00 00 00 00 00 00 00 00 00 00 00 00 00 00
6C0 43 5B CA 45 C5 C6 C7 C8 C9 16 CB CC CD CE CF D0
6D0 D1 D2 D3 D4 19 D6 1C 00 00 00 00 00 00 00 00 00
6E0 D5 00 00 00 00 00 00 00 00 00 00 00 00 00 00 00
6F0 00 00 00 00 00 00 00 00 00 00 00 00 00 00 00 00
700 0B 41 42 42 05 06 07 08 09 0A 0B 0C 0D 0E 0F 01
710 11 12 02 14 15 80 17 18 03 1A 1B 81 1D 1E 1F 83
720 00 00 00 00 00 00 00 00 00 00 00 00 00 00 00 00
730 00 00 00 00 00 00 00 00 00 00 00 00 00 00 00 00
740 43 45 62 44 04 46 47 48 49 4A 4B 4C 4D 4E 4F 10
750 51 52 53 54 55 56 57 58 59 5A 13 5C 5D 5E 5F C4
760 50 CA D6 00 00 00 00 00 00 00 00 00 00 00 00 00
770 00 00 00 00 00 00 00 00 00 00 00 00 00 00 00 00
780 C1 C3 E0 84 85 86 87 88 89 8A 82 8C 8D 8E 8F 90
790 91 92 93 94 0B 00 00 00 00 00 00 00 00 00 00 00
7A0 C2 00 00 00 00 00 00 00 00 00 00 00 00 00 00 00
7B0 00 00 00 00 00 00 00 00 00 00 00 00 00 00 00 00
7C0 43 5B CA 45 C5 C6 C7 C8 C9 16 CB CC CD CE CF D0
7D0 D1 D2 D3 D4 19 D6 1C 00 00 00 00 00 00 00 00 00
```

```
7E0  D5 00 00 00 00 00 00 00 00 00 00 00 00 00 00 00
7F0  00 00 00 00 00 00 00 00 00 00 00 00 00 00 00 00
```

Z8611 ROM code for universal floppy disk controller

File jan10.obj
Image size:      4113
Bss size:        0
Entry point:     0x0
Segment 0
Text size:       4113
Data size:       0
Bss size:        0
Text+Data......

```
0000:     ec01   53ea   b4ee   fa30   ecff   0515   8d04   25ff
0010:     ffff   ffff   ffec   0153   eab4   eefa   30ec   ec01
0020:     53ea   b4ee   fa30   ec56   03bf   4603   40af   ffff
0030:     ffff   ffff   ec01   53ea   b4ee   fa30   ecff   ffff
0040:     ffff   ff72   33eb   04ec   01e9   4afc   4f30   ec76
0050:     0304   6bf9   ec02   fcf0   30ec   ffff   ec01   53ea
0060:     b4ee   fa30   ecff   ffec   0153   eab4   eefa   30ec
0070:     0153   eab4   eefa   30ec   ffff   ffff   ffff   ffff
0080:     ffff   ec01   53ea   b4ee   fa30   ec56   03bf   4603
0090:     40af   ffff   ffff   ffff   ffff   ffff   ffff   ffff
00a0:     ffff   ffff   ffff   ffec   0153   eab4   eefa   30ec
00b0:     ffec   0153   eab4   eefa   30ec   764f   0f54   fce7
00c0:     9017   fcc6   30ec   764b   20eb   12ec   01fc   e330
00d0:     ec00   e356   16f7   6eb0   eefc   6730   ecec   01fc
00e0:     6f30   ecec   0153   eab4   eefa   30ec   ffff   ffff
00f0:     5058   9098   7078   b0b8   48c8   d0d8   68e8   f0a8
0100:     2800   294b   fc08   30ec   f8e2   5448   ef5d   0268
0110:     46ef   3f30   ece4   004e   b0ee   fc1e   30ec   e400
0120:     4d29   4eec   02fc   2330   ecfc   fc44   4bef   c2fe
0130:     b0ee   30ec   6902   2800   9226   8d03   63ff   ff8d
0140:     0271   ffb0   eefc   5730   ecff   ffff   ffff   ffe8
0150:     4a30   ecec   088d   083c   b0ee   30ec   7800   d772
0160:     7b2a   f5fc   5330   ec76   0304   ed03   e630   ec69
0170:     0282   2649   02ec   08fc   bb30   ecff   ffff   ff8d
0180:     026e   a64b   086d   07d5   ec07   fce0   30ec   664b
0190:     07ed   0143   5276   fc9a   30ec   9017   9017   06e7
01a0:     20b0   eefc   a730   ece5   e700   7eec   07fc   f330
01b0:     ec69   0228   0092   2649   02fc   bd30   ec7a   1656
01c0:     16f7   6efc   c730   ec3e   0006   eb09   fcd0   30ec
01d0:     8d03   e378   50b0   eefc   b130   ec7a   12ec   00fc
01e0:     d130   ec69   0282   2629   0049   02fc   db30   ecb0
01f0:     eefc   e330   ecff   ffff   ffff   ffff   345c   5c43
```

APPENDIX D

```
0200:     0303   0303   0103   0303   0303   0300   0303   0303
0210:     0110   1102   0312   1320   2130   3122   2332   3343
0220:     da30   ecb4   4fe2   444d   e2eb   04fc   3230   ecd6
0230:     0cc9   2c04   ec01   fc29   30ec   ffff   ffff   ffc2
0240:     0456   fadf   cc0d   dcc8   30ee   ffff   f047   f047
0250:     f047   f047   30ec   d602   5eff   ffff   8bee   af43
0260:     da30   ec74   4a4a   6b06   ec02   fc63   30ec   d60c
```

| | | | | | | | | |
|---|---|---|---|---|---|---|---|---|
| 0270: | c97c | 07ec | 02fc | e330 | ecff | ffff | ffff | ffc2 |
| 0280: | 0456 | e0fa | ed0d | 1e56 | fadf | e010 | af08 | f308 |
| 0290: | f309 | 2608 | f307 | 3b09 | 810a | 8705 | 63ff | ff43 |
| 02a0: | da30 | ec78 | 4856 | e7f0 | fcac | 30ec | f8e3 | 42f7 |
| 02b0: | f900 | ec07 | fcc0 | 30ec | ffff | ffff | ffff | ff45 |
| 02c0: | 0256 | fadf | dcdf | b0e9 | 0c02 | 30ec | 0172 | 2969 |
| 02d0: | 0182 | 2d59 | 0192 | 315c | 0d94 | 3553 | ffff | ff43 |
| 02e0: | da30 | ec54 | 4be7 | 2cad | 0227 | ec03 | fca3 | 30ec |
| 02f0: | 5604 | bee4 | 04f8 | ec03 | fc23 | 30ec | ffff | ffc2 |
| 0300: | 1456 | fadf | c210 | d0e1 | ed0d | 1eaf | dc1f | 30ee |
| 0310: | 2002 | 1eed | 0942 | 5ed2 | 8449 | 028d | 08eb | ff43 |
| 0320: | da30 | ec75 | 4b07 | 6b0b | 7c40 | fc2e | 30ec | 764b |
| 0330: | 066b | 06ec | 02fc | a330 | ecec | 00fc | ba30 | ecc2 |
| 0340: | 0456 | fadf | d70b | 40b2 | 903c | 0ec2 | 088e | b201 |
| 0350: | c218 | 98e0 | bab6 | 8d05 | a4ff | ffff | ffff | ff43 |
| 0360: | da30 | ec49 | 027a | 0a56 | 16f7 | 6e76 | e507 | 6d03 |
| 0370: | e3b0 | ee30 | ecff | ffff | ffff | ffff | ffff | ffc2 |
| 0380: | 0456 | fadf | d70b | 42b2 | 90ba | 038d | 05c0 | dc5f |
| 0390: | 30ee | 764c | 08eb | 06e6 | 100f | 0afe | ffaf | ff43 |
| 03a0: | da30 | ecb0 | e7f8 | e2c2 | feb0 | ee30 | ec4f | 4f34 |
| 03b0: | 0015 | 1515 | 15ff | ffff | ffff | ffff | ffff | ffc2 |
| 03c0: | 0456 | fadf | 9204 | b290 | 8c0e | c208 | 8eb2 | 10c2 |
| 03d0: | 9800 | e5dc | df30 | eedc | 9f30 | eeff | ffff | ff43 |
| 03e0: | da30 | ece6 | 4a01 | ec03 | fcec | 30ec | 4604 | 41e4 |
| 03f0: | 04f8 | b0ee | fc00 | 30ec | d60c | c929 | 008b | e7c2 |
| 0400: | 8456 | fadf | 9284 | b213 | 0c0e | c230 | 0eb2 | 98c2 |
| 0410: | 105a | c43e | 4e49 | 02dc | 9f00 | 42eb | 82bc | 02dc |
| 0420: | 5fcc | 0430 | ec31 | 1b8c | 049c | e3bc | 1ac3 | b8c3 |
| 0430: | b8c3 | a8ba | fc4a | f4d2 | 301e | d200 | 1ed2 | 009f |
| 0440: | 8d03 | f8e4 | 4e4f | cc02 | dc07 | 544b | ed90 | 1d06 |
| 0450: | ed8d | c20c | dec2 | dcc8 | e030 | ecff | ffff | ff43 |
| 0460: | da30 | ec0c | 050a | fe46 | 0210 | e610 | 030a | feff |
| 0470: | 5602 | efff | d284 | afff | ffff | ffff | ffff | ffc2 |
| 0480: | 0456 | fadf | 0947 | b290 | 8c0e | c208 | 8eb2 | 01c2 |
| 0490: | 1898 | e0ba | 0a76 | fa02 | eb02 | 4209 | 8d0a | d1dc |
| 04a0: | 5f30 | ee0a | 1418 | 0912 | 232c | 0d11 | 2c23 | 0106 |
| 04b0: | 0704 | 050a | 1814 | 0911 | 2c23 | 0d12 | 232c | 0106 |
| 04c0: | 0704 | 050a | 1418 | 0912 | 1114 | 0d11 | 1812 | 0106 |
| 04d0: | 0704 | 050a | 1814 | 0911 | 1412 | 0d12 | 1118 | 0106 |
| 04e0: | 0704 | 0510 | 07ff | 0300 | 0009 | 0000 | 0002 | 0220 |
| 04f0: | ff55 | f102 | c000 | 00f6 | 0688 | 0f55 | 0800 | 0000 |
| 0500: | fe01 | 007c | 0e01 | 9940 | 4b02 | 0000 | 0048 | 0200 |
| 0510: | 0000 | 1a01 | f900 | 0005 | 6d05 | ef56 | fadf | bf43 |
| 0520: | da30 | ecb6 | 0f80 | 5602 | bf88 | 0fd2 | 8446 | 0240 |
| 0530: | 26e5 | 02af | ffff | ffff | ffff | ffff | ffff | ffc2 |
| 0540: | 0456 | fadf | 9204 | b290 | 5a3f | 4e49 | 023e | dc1f |
| 0550: | 0042 | ebcb | dc5f | 8b07 | ffff | ffff | ffff | ff43 |
| 0560: | da30 | ec31 | 14d6 | 0bb9 | d605 | 8d8c | 0752 | 8490 |
| 0570: | 1890 | 18bc | 048d | 05e3 | ffff | ffff | ffff | ffc2 |
| 0580: | 0456 | fadf | b290 | 8d0a | d1dc | 1f30 | ee31 | 1456 |
| 0590: | f13f | 764c | 20eb | 1ad6 | 0d1e | 7bf1 | bc06 | cc03 |
| 05a0: | dc1f | 30ee | 4219 | ebe5 | 76fa | 02eb | e055 | f13f |
| 05b0: | afd6 | 0d1e | fbd7 | bc05 | cc03 | dc5f | 43da | 30ec |
| 05c0: | ebcb | 56f1 | 3f0c | 04c7 | 1042 | 9c44 | 8c88 | 5291 |
| 05d0: | 5281 | e018 | 9019 | 56e1 | 3342 | 1842 | 19d7 | 1042 |
| 05e0: | 0ae5 | afc7 | 0b42 | d708 | 208e | baf7 | 8d08 | f38f |
| 05f0: | 4648 | 3046 | 4810 | e640 | ff8d | 08f3 | ffff | ffff |

```
0600:    8c02    9c18    544c    e9e0    1906    e9cc    c208    9e0a
0610:    fe56    e407    46e4    e0d6    0bf2    0ca5    5602    df46
0620:    f1c0    d204    c208    9e0a    fe0c    ffd2    04d2    04d2
0630:    04d2    04c2    189e    c2d8    8c00    1afe    b60f    8008
0640:    0fbc    b89c    50d2    9456    02bf    d204    525b    4602
0650:    4030    ece6    10ff    8d06    ce8d    06fb    0c01    0afe
0660:    d2b4    dca7    30ec    e6e0    00ff    d2b4    8204    b210
0670:    e6e9    0f42    90f0    e9c2    b8d2    b49c    f042    90c2
0680:    b85a    e320    02aa    e3d2    b4e6    e002    9c0f    4291
0690:    f0e9    c2b8    9cf0    4291    d2b4    ff8d    072e    0c01
06a0:    0afe    d2b4    f010    ff82    04b2    109c    0f42    90f0
06b0:    e9c2    b8d2    b49c    f042    90c2    b8e6    10ff    5ade
06c0:    2002    aade    d2b4    0c03    8bc2    0c01    0afe    d2b4
06d0:    ffff    ff82    04b2    109c    0f42    90f0    e9c2    b8d2
06e0:    b49c    f042    90c2    b80c    010a    fe5a    dd20    02aa
06f0:    ddd2    b40c    058b    280c    010a    fed2    b4f0    1082
0700:    04b2    109c    0f42    90f0    e9c2    b8d2    b49c    f042
0710:    90c2    b8ff    5ae1    2002    aae1    d2b4    e6e0    049c
0720:    0f42    91f0    e9c2    b8e6    e9f0    4291    d2b4    c2b8
0730:    0afe    d2b4    0c05    0afe    8d0a    32d6    0cee    70ef
0740:    70ee    ec02    fc38    544b    efe0    1fe0    1f06    ef4c
0750:    d60b    b9b6    0f80    4cd0    d60b    f249    024c    f8b0
0760:    e546    f1c0    f010    8b1b    dc6c    30ee    8204    d204
0770:    5a0d    2002    4e6b    360c    010a    fef0    1030    ee1a
0780:    218a    1882    0400    e5dc    8b30    ee82    84d2    0400
0790:    e582    14b8    e500    e5f0    108b    cde4    1915    821a
07a0:    30ee    98eb    00e9    e610    010a    fe30    ee4c    8049
07b0:    0250    ee50    efd6    0c26    76fa    206b    fb8d    08eb
07c0:    76e7    106b    0ab4    e748    7277    db03    d60c    c9b0
07d0:    eefc    8230    ecd6    0cc9    780e    ec07    fce9    30ec
07e0:    7849    5649    bbfc    e930    ec79    007c    07ec    01fc
07f0:    8e30    ec76    e703    ed01    a1b0    eefc    6730    ecff
0800:    2c7c    fc06    30ec    c7f7    23a3    f2eb    15fc    1130
0810:    ec00    e72e    dbec    fc1a    30ec    b0ee    b0e7    fc4f
0820:    30ec    fc26    30ec    7c0f    544e    e7fc    2f30    ec22
0830:    372b    28fc    3730    ec56    16f7    0267    7c07    5276
0840:    fc44    30ec    9017    9017    fc4c    30ec    764b    01eb
0850:    0f28    4efc    5730    ec72    33eb    a5d6    0cc9    b0e7
0860:    2c04    fc66    30ec    c7f2    7bd7    f720    fc70    30ec
0870:    7e2a    effc    7730    ec76    4b01    6d00    437c    40fc
0880:    8330    ece4    4e06    5606    0f54    fce7    fc90    30ec
0890:    9017    6b02    2006    7950    fc9c    30ec    7648    106b
08a0:    03d6    0cc9    7c08    fcaa    30ec    2273    fcb0    30ec
08b0:    a406    e71b    e3ec    01fc    d330    ec29    5156    e277
08c0:    06e2    44fc    c730    ece0    51b4    51e2    56e2    bbfc
08d0:    d330    ecb4    51e2    6902    2900    4902    fce0    30ec
08e0:    7a03    8d01    ddb0    eefc    6f30    ec00    13d6    0b61
08f0:    d60b    78b0    4ad6    0cd9    3114    744d    4d6b    06cc
0900:    0cdc    3e30    ee31    401a    13d6    0b78    0a0e    76e9
0910:    226b    0956    49dd    e60f    40d6    0b64    3114    744a
0920:    4aed    0443    30ee    d60b    7831    1456    02b8    1cf8
0930:    8cff    5c02    0c20    b40f    e0d2    045e    d284    b0e9
0940:    b0ec    b0e5    0c07    5402    e0dc    0152    d05b    03b6
0950:    edad    b6ed    27b6    e004    f010    e010    5602    c744
0960:    e002    b0e0    2209    d204    d4ec    8208    d204    5c02
0970:    0c60    b40f    e0d2    04b6    e040    d204    9ac4    8d03
0980:    10d6    0cee    4648    80d6    0bb9    d605    8d8c    0752
```

| | | | | | | | | |
|---|---|---|---|---|---|---|---|---|
| 0990: | 8490 | 1890 | 18bc | 0406 | e820 | c70b | 42a3 | 08eb |
| 09a0: | e98e | baf6 | ac0f | 5448 | eaeb | 025c | 8006 | e502 |
| 09b0: | 764c | 20ed | 0600 | 0ccc | ff0a | fdb0 | e846 | e4c0 |
| 09c0: | 55e4 | dfd6 | 0bf2 | 46f1 | c0d2 | 840c | c00a | fe75 |
| 09d0: | 4c08 | 6d0a | 608c | a1e6 | 1005 | 0afe | d604 | 6a1c |
| 09e0: | 95d6 | 0463 | 9ce2 | d604 | 638c | fbd6 | 0463 | d605 |
| 09f0: | 23e6 | 1003 | 0afe | ff8b | 080c | 030a | feff | d603 |
| 0a00: | 9282 | 04d2 | 04b2 | 908c | 0ec2 | 038e | b201 | c218 |
| 0a10: | 98e0 | 5ae5 | 4e49 | 02aa | 43d6 | 0392 | e610 | 020a |
| 0a20: | fe8c | 04d2 | 9498 | e11c | ffd6 | 0392 | 0c08 | 0afe |
| 0a30: | 8af1 | d60c | 26ac | facc | 0adc | 3d30 | ee76 | fa20 |
| 0a40: | 6bf5 | d60c | d908 | 4856 | e00f | eb01 | 0e22 | 30eb |
| 0a50: | 0356 | 487f | a230 | 9b02 | b04a | 30ee | ffff | 8b9e |
| 0a60: | 8cc5 | e610 | 1c0a | fed2 | 84e6 | 1004 | 0afe | 4602 |
| 0a70: | 10e6 | 100c | 0afe | 1c84 | 5602 | ef0c | 010a | fe9c |
| 0a80: | bfd5 | 0523 | 8d0a | 0146 | 4840 | d60b | b9d6 | 058d |
| 0a90: | 8c07 | 5284 | 9018 | 9018 | bc04 | 06e8 | 20c7 | 0b42 |
| 0aa0: | a308 | ebe9 | 8eba | f676 | 4c20 | ed0b | 08d6 | 0d1e |
| 0ab0: | fbdb | 8c0f | 544f | e8eb | 038e | 5c80 | 8942 | 1c95 |
| 0ac0: | 9ce2 | 764c | 08eb | 041c | 849c | bfcc | 03dc | 9f30 |
| 0ad0: | eeed | 05f3 | 56f1 | 3fb0 | 4ae6 | 40ff | e605 | 78d6 |
| 0ae0: | 058d | a6e3 | 089b | f88c | 0752 | 8490 | 1890 | 18bc |
| 0af0: | 04c7 | 0b42 | d708 | 208e | baf7 | 0c0f | 5448 | e002 |
| 0b00: | 03a6 | e008 | abd9 | 8b9f | d60d | 1e7d | 0a8d | b0e9 |
| 0b10: | cc05 | 8c0f | 544f | e8eb | 038e | 5c80 | 8942 | dc1f |
| 0b20: | 30ec | 310a | ac04 | 764f | 206b | 0290 | 0a72 | faeb |
| 0b30: | 0642 | facc | 02dc | 4ee0 | 0ae0 | 0a42 | fab6 | eafc |
| 0b40: | 52fa | b44e | ef56 | efef | b44e | ef56 | 49cc | bc0f |
| 0b50: | 52bf | 6b0a | 06eb | 0fac | 02c2 | aa44 | ea49 | 8d0b |
| 0b60: | 6456 | 0f7f | 310a | acff | bc01 | 5602 | bfd2 | eabe |
| 0b70: | d2fa | 4602 | 4031 | 10af | 70fd | 310a | a8e2 | 56ea |
| 0b80: | 88b8 | eab4 | 49ea | 5649 | 7744 | eb49 | e00a | 56ea |
| 0b90: | 446b | 2344 | ea49 | e00a | e00a | e449 | eb60 | eb52 |
| 0ba0: | ab6b | 1306 | ea03 | 56ea | 0c60 | eab6 | ef40 | 52fa |
| 0bb0: | b6ef | 40d6 | 0b64 | 50fd | afe4 | 4b4c | b44e | 4856 |
| 0bc0: | 48f0 | b44e | 48d6 | 0b22 | e605 | 78e6 | f2fa | e6f3 |
| 0bd0: | 4b46 | f10c | 56fa | dfd6 | 0b78 | 310c | da07 | ca05 |
| 0be0: | cede | 3114 | af31 | 1476 | fa20 | ebe8 | cc0b | dce5 |
| 0bf0: | 30ee | 3109 | 5602 | bfac | ffbc | 029c | 20b2 | 9fd2 |
| 0c00: | 9abe | 9cff | d29a | b0eb | d2ba | 9cbf | 5414 | e928 |
| 0c10: | e9d6 | 0027 | bc03 | b0e9 | d29a | 00eb | d2fa | 3114 |
| 0c20: | e5ff | ec49 | 02af | 4602 | 2056 | f13f | 4802 | e60c |
| 0c30: | ffe6 | f33f | e6f2 | 5746 | f10c | 56fa | dfaf | e44e |
| 0c40: | 4fd6 | 0b22 | e6f2 | fae6 | f34b | 46f1 | 0c46 | 4820 |
| 0c50: | e640 | 0c8d | 0c56 | 310a | 764f | 206b | 02f0 | 0ea8 |
| 0c60: | ee56 | ea0f | bc80 | 544f | ebf0 | 0b90 | 0b42 | baac |
| 0c70: | 80a6 | 4d02 | 54fc | eae0 | 0ae0 | 0a42 | baac | 0406 |
| 0c80: | eba3 | c29a | bc0f | 52b9 | b2eb | 764f | 206b | 02f0 |
| 0c90: | 0ed6 | 0b64 | 3109 | f0e9 | 56e9 | 0324 | e94d | da04 |
| 0ca0: | ca02 | cede | 56fa | dfd6 | 0b78 | 3114 | cc0c | dcb2 |
| 0cb0: | 30ee | 76fa | 205b | f974 | 4d4d | eb9a | 0040 | ebf0 |
| 0cc0: | 5648 | dfe6 | 40ff | 8d08 | f831 | 1056 | 487f | b0e3 |
| 0cd0: | 5602 | f86c | 6053 | 0248 | 028f | 56f1 | 3fd6 | 0b61 |
| 0ce0: | dcf8 | cc08 | acfa | 507a | 507b | e6ff | 7aaf | 3110 |
| 0cf0: | 0c08 | 764f | 206b | 02f0 | 1074 | e002 | eb03 | 7648 |
| 0d00: | 10ed | 08f2 | afff | ffff | ffff | ffff | ffff | ffff |
| 0d10: | ffff | ffff | ffff | ffff | ffff | ffff | ffff | 0005 |

```
0d20:   6d05   efb0   f2e6   f303   46f1   0c55   fadf   46fb
0d30:   209f   56f1   3f55   e407   46e4   7049   02d6   0bf2
0d40:   0c00   d204   46f1   c056   14ef   ff49   0256   fafd
0d50:   1c02   764c   20eb   021c   0a0c   085c   629c   0588
0d60:   f146   e80c   dc68   30ee   1aef   76fa   02eb   de56
0d70:   fafd   d254   4602   108f   99f3   b0e5   764c   20eb
0d80:   6fe6   f210   89f1   56fa   df09   f276   4c08   eb30
0d90:   89f1   56fa   fbdc   9930   ee76   fa04   6bfb   4902
0da0:   76fa   02ed   0d1e   9cef   1c21   76fa   206b   fbc2
0db0:   0476   fa02   6d0d   1e56   fafd   cc02   dc81   30ee
0dc0:   cc02   dc1f   30ee   a6e0   a1ed   0d1e   76fa   026d
0dd0:   0d1e   56fa   fd76   fa20   6bfb   76fa   026d   0d1e
0de0:   56fa   df56   fafd   9cb2   1c30   cc02   dc5f   30ee
0df0:   e6f2   0189   f156   fadf   09f2   cc02   dc9f   30ec
0e00:   0010   2030   4050   6070   8191   a1b1   c1d1   e1f1
0e10:   1202   3222   5242   7262   9383   b3a3   d3c3   f3e3
0e20:   2434   0414   6474   4454   a5b5   8595   e5f5   c5d5
0e30:   3626   1606   7666   5646   b7a7   9787   f7e7   d7c7
0e40:   4858   6878   0818   2838   c9d9   e9f9   9999   a9b9
0e50:   5a4a   7a6a   1a0a   3a2a   dbcb   fbeb   9b8b   bbab
0e60:   6c7c   4c5c   2c3c   0c1c   edfd   cddd   adbd   8d9d
0e70:   7e6e   5e4e   3e2e   1e0e   ffef   dfcf   bfaf   9f8f
0e80:   9181   b1a1   d1c1   f1e1   1000   3020   5040   7060
0e90:   8393   a3b3   c3d3   e3f3   0212   2232   4252   6272
0ea0:   b5a5   9585   f5e5   d5c5   3424   1404   7464   5444
0eb0:   a7b7   8797   e7f7   c7d7   2636   0616   6676   4656
0ec0:   d9c9   f9e9   9989   b9a9   5848   7868   1808   3828
0ed0:   cbdb   ebfb   8b9b   abbb   4a5a   6a7a   0a1a   2a3a
0ee0:   fded   ddcd   bdad   9d8d   7c6c   5c4c   3c2c   1c0c
0ef0:   efff   cfdf   afbf   8f9f   6e7e   4e5e   2e3e   0e1e
0f00:   0021   4263   84a5   c6e7   0829   4a6b   8cad   ceef
0f10:   3110   7352   b594   f7d6   3918   7b5a   bd9c   ffde
0f20:   6243   2001   e6c7   a485   6a4b   2809   eecf   ac8d
0f30:   5372   1130   d7f6   95b4   5b7a   1938   dffe   9dbc
0f40:   c4e5   86a7   4061   0223   cced   8eaf   4869   0a2b
0f50:   f5d4   b796   7150   3312   fddc   bf9e   7958   3b1a
0f60:   a687   e4c5   2203   6041   ae8f   eccd   2a0b   6849
0f70:   97b6   d5f4   1332   5170   9fbe   ddfc   1b3a   5978
0f80:   88a9   caeb   0c2d   4e6f   80a1   c2e3   0425   4667
0f90:   b998   fbda   3d1c   7f5e   b190   f3d2   3514   7756
0fa0:   eacb   a889   6e4f   2c0d   e2c3   a081   6647   2405
0fb0:   dbfa   99b8   5f7e   1d3c   d3f2   91b0   5776   1534
0fc0:   4c6d   0e2f   c8e9   8aab   4465   0627   c0e1   82a3
0fd0:   7d5c   3f1e   f9d8   bb9a   7554   3716   f1d0   b392
0fe0:   2e0f   6c4d   aa8b   e8c9   2607   6445   a283   e0c1
0ff0:   1f3e   5d7c   9bba   a9f8   1736   5574   93b2   d1f0
```

It is claimed:

1. A computer system disk controller adapted to transfer digital data between a computer and magnetic data storage media read/write head means, comprising:

means including a programmable state machine for translating between digital data of the computer system and signals in a form placed onto said magnetic storage media;

said state machine including a signal input line, a signal output line, a random access memory having an address input of a plurality of bit lines and data output of a plurality of bit lines, said signal input line being connected to one of said address bit lines, a latch having an input of a plurality of bit lines and an output of a plurality of bit lines, said signal output line being connected to one of the latch output bit lines, a bus connecting the memory data output bit lines with the latch input bit lines, a bus connecting a plurality of the latch output bit lines with a plurality the memory address input bit lines, means selectively connecting said state machine signal input and output lines between the computer and the head means for causing the controller to operate in either a data read or write mode, and means for programming said state machine to select one of a plurality of specific magnetic media signal formats that are translated by said translating means, whereby said controller can interface a given computer with a magnetic storage system having one of said plurality of magnetic signal formats.

2. The controller according to claim 1 wherein said specific magnetic signal formats include FM, MFM, GCR and RLL formats.

3. The controller according to claim 1 wherein the programmable state machine of said translating means includes a random access memory, and wherein said programming means includes means for loading said random access memory with computer code of a selected one of said plurality of signal formats.

4. The controller according to claim 1 wherein said memory data loading means includes means for introducing the data and its addresses though said bus connecting the memory data output bit lines with the latch input bit lines.

5. The controller according to claim 1 which additionally comprises a microcomputer connected to control its operation, said microcomputer having a plurality of input/output lines connected to a plurality of said memory address bit lines.

* * * * *